United States Patent
Li et al.

(10) Patent No.: US 10,602,456 B2
(45) Date of Patent: Mar. 24, 2020

(54) METHOD AND APPARATUS FOR PATHLOSS DERIVATION FOR BEAM OPERATION IN A WIRELESS COMMUNICATION SYSTEM

(71) Applicant: ASUSTek Computer Inc., Taipei (TW)

(72) Inventors: Ming-Che Li, Taipei (TW); Ko-Chiang Lin, Taipei (TW); Li-Chih Tseng, Taipei (TW)

(73) Assignee: ASUSTek Computer Inc., Taipei (TW)

(*) Notice: Subject to any disclaimer, the term of this patent is extended or adjusted under 35 U.S.C. 154(b) by 0 days.

(21) Appl. No.: 15/673,971

(22) Filed: Aug. 10, 2017

(65) Prior Publication Data
US 2018/0049137 A1 Feb. 15, 2018

Related U.S. Application Data

(60) Provisional application No. 62/372,942, filed on Aug. 10, 2016.

(51) Int. Cl.
*H04W 52/24* (2009.01)
*H04B 17/309* (2015.01)
(Continued)

(52) U.S. Cl.
CPC ........ *H04W 52/242* (2013.01); *H04B 17/309* (2015.01); *H04W 52/146* (2013.01); *H04B 7/0617* (2013.01); *H04B 7/0626* (2013.01)

(58) Field of Classification Search
CPC . H04W 52/04; H04W 52/146; H04W 52/242; H04W 40/08; H04W 48/20;
(Continued)

(56) References Cited

U.S. PATENT DOCUMENTS

2013/0040578 A1* 2/2013 Khoshnevis ........ H04W 52/242
455/67.11
2013/0040684 A1 2/2013 Yu et al.
(Continued)

FOREIGN PATENT DOCUMENTS

CN 103814610 A 5/2014
CN 103891161 A 6/2014
(Continued)

OTHER PUBLICATIONS

Office Action from Taiwanese Patent Office in the corresponding TW Application No. 106127181, dated May 11, 2018.
(Continued)

*Primary Examiner* — Shaima Q Aminzay
(74) *Attorney, Agent, or Firm* — Blue Capital Law Firm, P.C.

(57) ABSTRACT

A method and apparatus are disclosed, from the perspective of the UE, for deriving UE transmit power. In one embodiment, the method includes the UE deriving a first pathloss value measured from a first reference signal. In addition, the method includes the UE deriving a second pathloss value measured from a second reference signal. The method also includes the UE transmitting a first UL transmission wherein the UL transmit power of the first UL transmission is derived from the first pathloss value. The method further includes the UE transmitting a second UL transmission wherein the UL transmit power of the second UL transmission is derived from the second pathloss value.

24 Claims, 16 Drawing Sheets

(51) Int. Cl.
*H04W 52/14* (2009.01)
*H04B 7/06* (2006.01)

(58) Field of Classification Search
CPC . H04W 72/042; H04W 72/08; H04W 74/004; H04W 24/10; H04W 52/245; H04W 52/40; H04W 52/18; H04B 17/309; H04B 7/0617; H04B 7/0626
USPC .......................................................... 455/522
See application file for complete search history.

(56) References Cited

U.S. PATENT DOCUMENTS

| | | |
|---|---|---|
| 2013/0077571 A1 | 3/2013 | Papasakellariou et al. |
| 2013/0217404 A1* | 8/2013 | Jung ................... H04W 72/08 455/452.1 |
| 2013/0272158 A1 | 10/2013 | Park et al. |
| 2014/0016576 A1 | 1/2014 | Noh |
| 2014/0133448 A1 | 5/2014 | Xu et al. |
| 2014/0295909 A1* | 10/2014 | Ouchi ................. H04W 52/242 455/522 |

FOREIGN PATENT DOCUMENTS

| | | |
|---|---|---|
| EP | 2779760 A1 | 7/2012 |
| EP | 2779760 | 9/2014 |
| JP | 2013-118619 | 6/2013 |
| KR | 2014-0009902 | 10/2014 |
| WO | 2013051824 | 4/2013 |

OTHER PUBLICATIONS

European Search Report from corresponding EP Application No. 17185678.4, dated Nov. 7, 2017.
InterDigital Communications, Beam-based design framework for New Radio[online], 3GPP TSG-RAN WG1#85 R1-164874, Internet <URL:http://www.3gpp.org/ftp/tsg_ran/WG1_RL1/TSGR1_985/Docs/R1-164874.zip>, May 27, 2016, pp. 1-5.
Office Action from Japan Patent Office in corresponding JP Application No. 2017-155214, dated Nov. 6, 2018.
Notice of Submission of Opinion office action from Korean Intellectual Property Office in corresponding KR Application No. 10-2017-0101644, dated Dec. 16, 2018.
Office Action from SIPO in corresponding SIPO Application No. 201710681470.2, dated Mar. 21, 2019.

* cited by examiner

| TDD UL/DL | subframe number $i$ | | | | | | | | | |
|---|---|---|---|---|---|---|---|---|---|---|
| Configuration | 0 | 1 | 2 | 3 | 4 | 5 | 6 | 7 | 8 | 9 |
| 0 | - | - | 6 | 7 | 4 | - | - | 6 | 7 | 4 |
| 1 | - | - | 6 | 4 | - | - | - | 6 | 4 | - |
| 2 | - | - | 4 | - | - | - | - | 4 | - | - |
| 3 | - | - | 4 | 4 | 4 | - | - | - | - | - |
| 4 | - | - | 4 | 4 | - | - | - | - | - | - |
| 5 | - | - | 4 | - | - | - | - | - | - | - |
| 6 | - | - | 7 | 7 | 5 | - | - | 7 | 7 | - |

FIG. 6 (PRIOR ART)

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | -1 | -4 |
| 1 | 0 | -1 |
| 2 | 1 | 1 |
| 3 | 3 | 4 |

FIG. 7 (PRIOR ART)

| TPC Command Field in DCI format 3A | Accumulated $\delta_{PUSCH,c}$ [dB] |
|---|---|
| 0 | -1 |
| 1 | 1 |

FIG. 8 (PRIOR ART)

| TPC Command Field in DCI format 1A/1B/1D/1/2A/2B/2C/2D/2/3 | $\delta_{PUCCH}$ [dB] |
|---|---|
| 0 | -1 |
| 1 | 0 |
| 2 | 1 |
| 3 | 3 |

FIG. 9 (PRIOR ART)

| TPC Command Field in DCI format 3A | $\delta_{PUCCH}$ [dB] |
|---|---|
| 0 | -1 |
| 1 | 1 |

FIG. 10 (PRIOR ART)

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity<br><br>If the UE is configured with PMI/RI reporting: closed-loop spatial multiplexing |
| 9 | For a non-BL/CE UE, if the UE is configured without PMI/RI reporting: if the number of PBCH antenna ports is one, single-antenna port, port 0; otherwise transmit diversity<br><br>For a non-BL/CE UE, if the UE is configured with PMI/RI reporting or without PMI reporting: if the number of CSI-RS ports is one, single-antenna port, port 7; otherwise up to 8 layer transmission, ports 7-14 (see subclause 7.1.5B)<br><br>For a BL/CE UE, if the UE is not configured with periodic CSI reporting mode 1-1: if the number of PBCH antenna ports is one, single-antenna port, port 0; otherwise transmit diversity<br><br>For a BL/CE UE, if the UE is configured with periodic CSI reporting mode 1-1: if the number of PBCH antenna ports is one, single-antenna port, port 0; otherwise closed-loop spatial multiplexing with a single transmission layer |
| 10 | If a CSI process of the UE is configured without PMI/RI reporting: if the number of CSI-RS ports is one, single-antenna port, port7; otherwise transmit diversity<br><br>If a CSI process of the UE is configured with PMI/RI reporting or without PMI reporting: if the number of CSI-RS ports is one, single-antenna port, port 7; otherwise up to 8 layer transmission, ports 7-14 (see subclause 7.1.5B) |

FIG. 11 (PRIOR ART)

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 12 (PRIOR ART)

| CQI index | modulation | code rate x 1024 | efficiency |
|---|---|---|---|
| 0 | out of range | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

FIG. 13 (PRIOR ART)

| CQI index | modulation | code rate x 1024 x $R^{CSI}$ | efficiency |
|---|---|---|---|
| 0 | out of range | | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | Reserved | Reserved | Reserved |
| 12 | Reserved | Reserved | Reserved |
| 13 | Reserved | Reserved | Reserved |
| 14 | Reserved | Reserved | Reserved |
| 15 | Reserved | Reserved | Reserved |

FIG. 14 (PRIOR ART)

| DL RS | Associated UL transmission |
|---|---|
| BRS | *Pathloss value of a specific eNB beam* |
| | Preamble, SR, periodic CSI, SRS for channel measurement |
| | HARQ-ACK, aperiodic CSI, a new channel for beam reporting |
| | *Selected/combined pathloss value* |
| | UL data transmission, SRS for beam sweeping |
| | aperiodic CSI, HARQ-ACK, SRS for channel measurement |
| DMRS for DL control | UL data transmission with control signaling (if DL control and UL data uses the same eNB beams) |
| | aperiodic CSI, aperiodic SRS, HARQ-ACK for DL control signaling, HARQ-ACK for DL data transmission |
| DMRS for DL data | HARQ-ACK for DL data |
| CSI-RS | UL data transmission |
| | aperiodic CSI, periodic CSI |
| Pathloss RS | UL transmission, except (contention-based) preamble in case of UE-specific pathloss RS |

FIG. 17

METHOD AND APPARATUS FOR PATHLOSS DERIVATION FOR BEAM OPERATION IN A WIRELESS COMMUNICATION SYSTEM

CROSS-REFERENCE TO RELATED APPLICATIONS

The present Application claims the benefit of U.S. Provisional Patent Application Ser. No. 62/372,942 filed on Aug. 10, 2016, the entire disclosure of which is incorporated herein in their entirety by reference.

FIELD

This disclosure generally relates to wireless communication networks, and more particularly, to a method and apparatus for pathloss derivation for beam operation in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed, from the perspective of the UE, for deriving UE transmit power. In one embodiment, the method includes the UE deriving a first pathloss value measured from a first reference signal. In addition, the method includes the UE deriving a second pathloss value measured from a second reference signal. The method also includes the UE transmitting a first UL transmission wherein the UL transmit power of the first UL transmission is derived from the first pathloss value. The method further includes the UE transmitting a second UL transmission wherein the UL transmit power of the second UL transmission is derived from the second pathloss value.

BRIEF DESCRIPTION OF THE DRAWINGS

FIG. 6 is a reproduction of Table 5.1.1.1-1 of 3GPP TS 36.213 v13.1.1.

FIG. 7 is a reproduction of Table 5.1.1.1-2 of 3GPP TS 36.213 v13.1.1.

FIG. 8 is a reproduction of Table 5.1.1.1-3 of 3GPP TS 36.213 v13.1.1.

FIG. 9 is a reproduction of Table 5.1.2.1-1 of 3GPP TS 36.213 v13.1.1.

FIG. 10 is a reproduction of Table 5.1.2.1-2 of 3GPP TS 36.213 v13.1.1.

FIG. 11 is a reproduction of Table 7.2.3-0 of 3GPP TS 36.213 v13.1.1.

FIG. 12 is a reproduction of Table 7.2.3-1 of 3GPP TS 36.213 v13.1.1.

FIG. 13 is a reproduction of Table 7.2.3-2 of 3GPP TS 36.213 v13.1.1.

FIG. 14 is a reproduction of Table 7.2.3-3 of 3GPP TS 36.213 v13.1.1.

FIG. 17 is a diagram according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia and Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; RP-150465, "New SI proposal: Study on Latency reduction techniques for LTE", Ericsson and Huawei; and TS 36.213 v13.1.1, "E-UTRA Physical layer procedures (Release 13)." The standards and documents listed above are hereby expressly incorporated by reference in their entirety.

Figure 1:
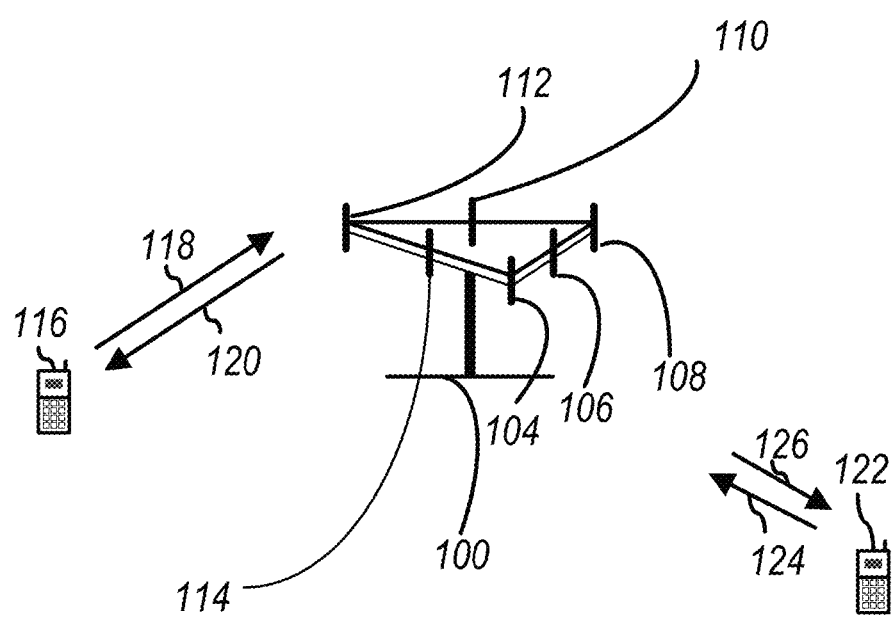
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group.

Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
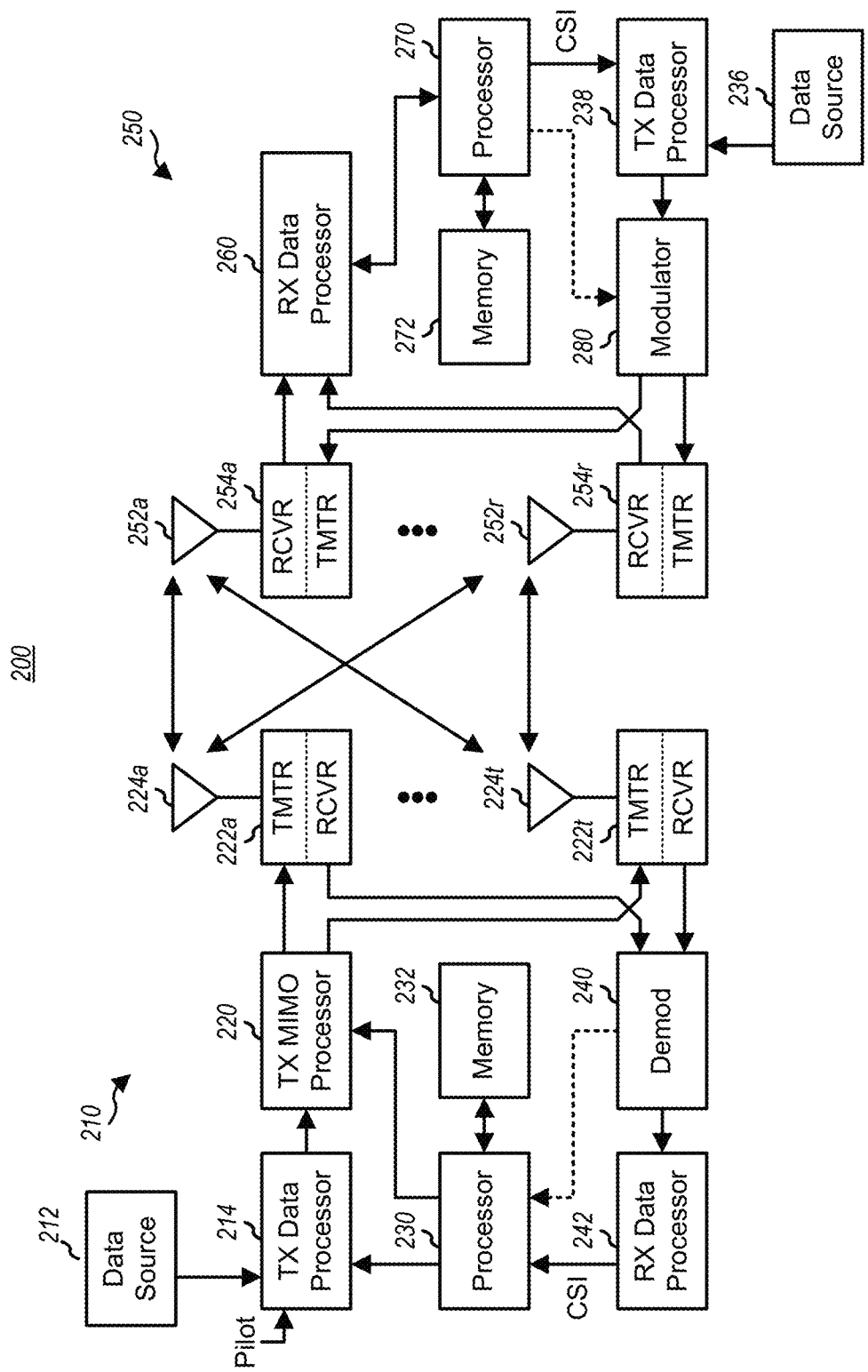
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
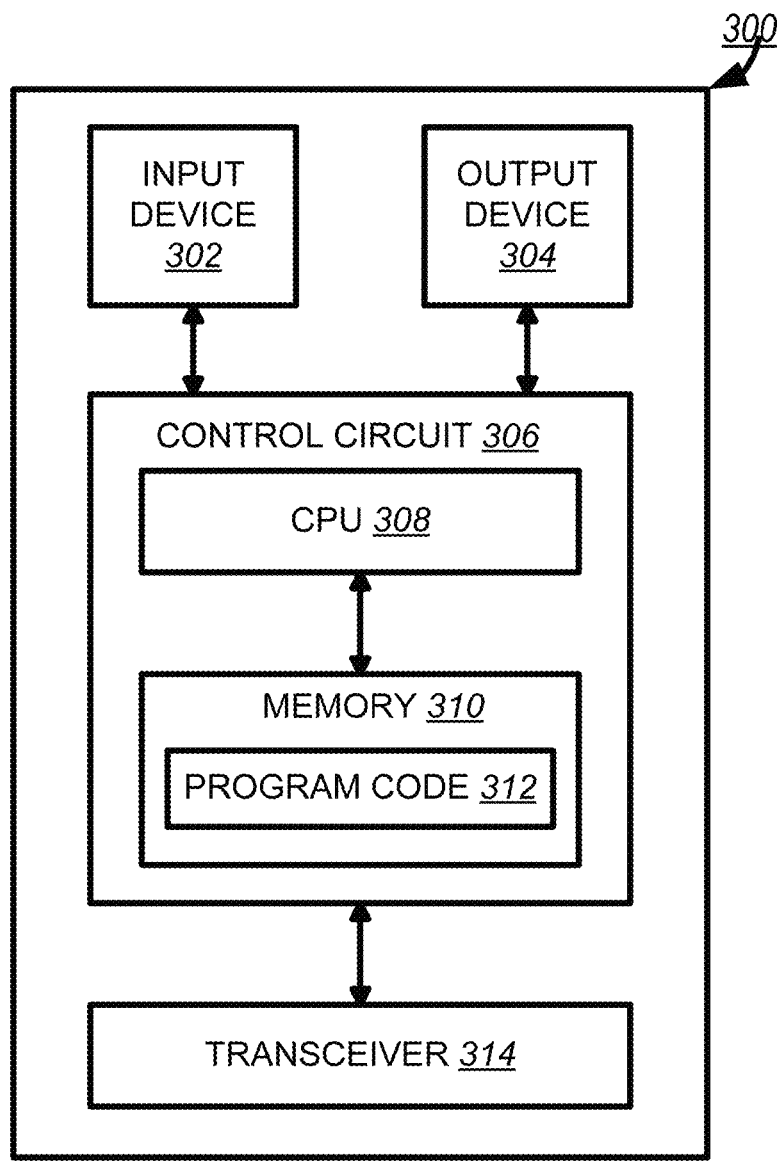
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
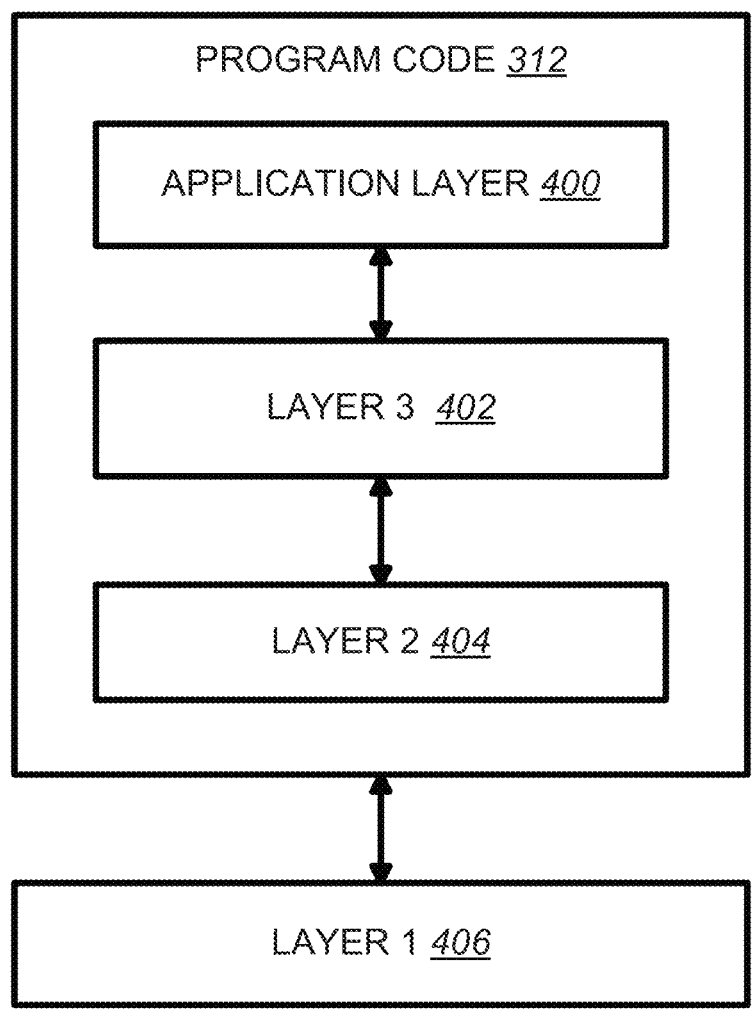
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As described in 3GPP R2-162366, in lower frequency bands (e.g., current LTE bands <6 GHz), the required cell coverage may be provided by forming a wide sector beam for transmitting downlink common channels. However, in utilizing wide sector beam on higher frequencies (>>6 GHz), the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

Because the high gain beams are narrow compared to a wide sector beam, multiple beams for transmitting downlink common channels are needed to cover the required cell area. The number of concurrent high gain beams that an access point is able to form may be limited by the cost and complexity of the utilized transceiver architecture. In practice, on higher frequencies, the number of concurrent high gain beams is much less than the total number of beams required to cover the cell area. In other words, the access point is able to cover only part of the cell area by using a subset of beams at any given time.

As described in 3GPP R2-163716, beamforming is generally a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Beamforming can be generally categorized into three types of implementation: digital beamforming, hybrid beamforming, and analog beamforming. For digital beamforming, the beam is generated on the digital domain, i.e., the weighting of each antenna element can be controlled by baseband (e.g., connected to a TXRU (Transceiver Unit)). Therefore it is very easy to tune the beam direction of each subband differently across the system bandwidth. Also, to change beam direction from time to time does not require any switching time between OFDM (Orthogonal Frequency Division Multiplexing) symbols. All beams whose directions cover the whole coverage can be generated simultaneously. However, this structure requires (almost) one-to-one mapping between TXRU (transceiver/RF chain) and antenna element and is quite complicated as the number of antenna element increases and system bandwidth increases (also heat problem exists).

Figure 5:
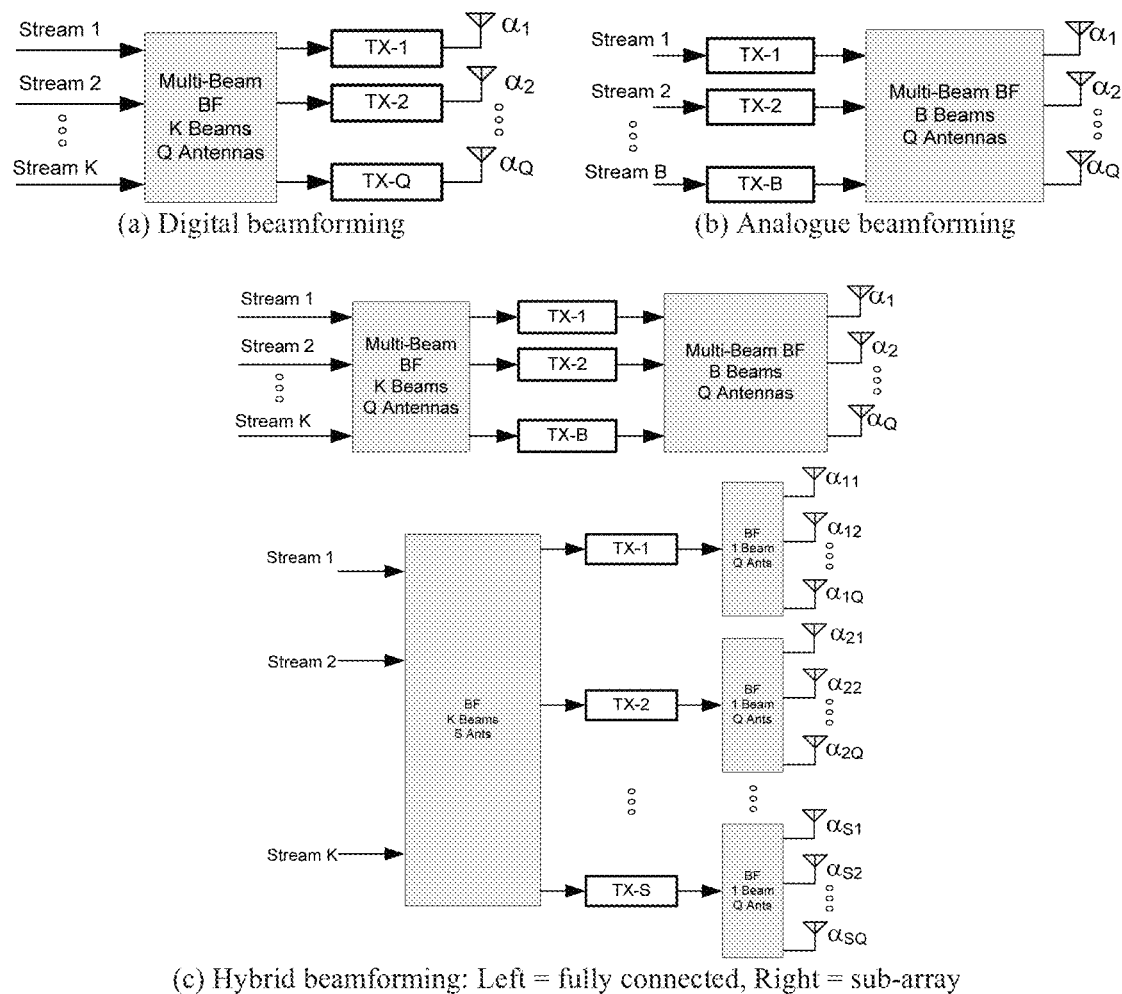
FIG. 5 is a diagram illustrating three types of beamforming according to one exemplary embodiment.

For analog beamforming, the beam is generated on the analog domain, i.e., the weighting of each antenna element can be controlled by an amplitude/phase shifter in the RF (Radio Frequency) circuit. Since the weighing is purely controlled by the circuit, the same beam direction would apply on the whole system bandwidth. Also, if beam direction is to be changed, switching time is required. The number of beam generated simultaneous by an analog beamforming depends on the number of TXRU. Note that for a given size of array, the increase of TXRU may decrease the antenna element of each beam, such that wider beam would be generated. In short, analog beamforming could avoid the complexity and heat problem of digital beamforming, while is more restricted in operation. Hybrid beamforming can be considered as a compromise between analog and digital beamforming, where the beam can come from both analog and digital domain. The three types of beamforming is shown in FIG. 5.

As discussed in 3GPP R2-162709, an eNB (evolved Node B) may have multiple TRPs (either centralized or distributed). Each TRP (Transmission/Reception Point) can form multiple beams. The number of beams and the number of simultaneous beams in the time/frequency domain depend on the number of antenna array elements and the RF at the TRP.

Potential mobility type for NR can be listed as follows:
Intra-TRP mobility
Inter-TRP mobility
Inter-NR eNB mobility As discussed in 3GPP R2-162762, reliability of a system purely relying on beamforming and operating in higher frequencies might be challenging, since the coverage might be more sensitive to both time and space variations. As a consequence of that the SINR (Signal-to-interference-and-Noise Ratio) of that narrow link can drop much quicker than in the case of LTE.

Using antenna arrays at access nodes with hundreds of elements, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

In RAN1 #85 meeting, some agreements about beamforming are as follows:
Following three implementations of beamforming are to be studied in NR
Analog beamforming
Digital beamforming
Hybrid beamforming
Note: The physical layer procedure design for NR can be agnostic to UE/TRP with respect to the beamforming implementations employed at TRP/UE, but it may pursue beamforming implementation specific optimization not to lose efficiency
RAN1 studies both multi-beam based approaches and single-beam based approaches for these channels/signals/measurement/feedback
Initial-access signals (synchronization signals and random access channels)
System-information delivery
RRM measurement/feedback
L1 control channel
Others are FFS
Note: The physical layer procedure design for NR can be unified as much as possible whether multi-beam or single-beam based approaches are employed at TRP at least for synchronization signal detection in stand-alone initial access procedure
Note: single beam approach can be a special case of multi beam approach Note: Individual optimization of single beam approach and multiple beam approach is possible Multi-beam based approaches
- In Multi-beam based approaches, multiple beams are used for covering a DL coverage area and/or UL coverage distance of a TRP/a UE
- One example of multi-beam based approaches is beam sweeping:
  - When beam sweeping is applied for a signal (or a channel), the signal (the channel) is transmitted/received on multiple beams, which are on multiple time instances in finite time duration
    - Single/multiple beam can be transmitted/received in a single time instance
  - Others are FFS Single-beam based approaches
- In single-beam based approaches, the single beam can be used for covering a DL coverage area and/or UL coverage distance of a TRP/a UE, similarly as for LTE cell-specific channels/RS For both single-beam and multi-beam based approaches, RAN1 can consider followings in addition
- Power boosting
- SFN
- Repetition
- Beam diversity (only for multi-beam approach)
- Antenna diversity
- Other approaches are not precluded Combinations of single-beam based and multi-beam based approaches are not precluded Agreements:
- RAN1 to study the beamforming procedures and their system impacts at least for multi beam based approach
  - Physical layer procedures for beamforming optimizing different metrics such as overheads and latencies in multi beam and single beam based approaches
  - Physical layer procedures in multi beam based approach that require beam training, i.e. steering of transmitter and/or receiver beams
    - E.g. Periodic/Aperiodic downlink/uplink TX/RX beam sweeping signals, where periodic signals may be semi-statically or dynamically configured (FFS)
    - E.g. UL sounding signals
    - Other example is not precluded Agreements:
- Both intra-TRP and inter-TRP beamforming procedures are considered.
- Beamforming procedures are considered with/without TRP beamforming/beam sweeping and with/without UE beamforming/beam sweeping, according to the following potential use cases:
  - UE movement, UE rotation, beam blocking:
    - Change of beam at TRP, same beam at UE
    - Same beam at TRP, change of beam at UE
    - Change of beam at TRP, change of beam at UE
    - Other cases are not precluded With the support of beam operation and TRP, a cell may have multiple choices to schedule a UE. For example, there may be multiple beams from a TRP transmitting the same data to the UE, which can provide more reliability for the transmission. Alternatively, multiple beams from multiple TRPs transmit the same data to the UE. To increase the throughput, it is also possible for a single TRP to transmit different data on different beams for the UE. Also, multiple TRPs can transmit different data on different beams to the UE.

In LTE system, the UL transmit power is determined by multiple factors wherein one of the factors is the DL pathloss. In general, the pathloss is derived from CRS measurement. More detail information can be found in Section 5 of 3GPP TS 36.213 as follows:

Power Control

Downlink power control determines the Energy Per Resource Element (EPRE). The term resource element energy denotes the energy prior to CP insertion. The term resource element energy also denotes the average energy taken over all constellation points for the modulation scheme applied. Uplink power control determines the average power over a SC-FDMA symbol in which the physical channel is transmitted.

5.1 Uplink Power Control

Uplink power control controls the transmit power of the different uplink physical channels. For PUSCH, the transmit power $\hat{P}_{PUSCH,c}(i)$ defined in subclause 5.1.1, is first scaled by the ratio of the number of antennas ports with a non-zero PUSCH transmission to the number of configured antenna ports for the transmission scheme. The resulting scaled power is then split equally across the antenna ports on which the non-zero PUSCH is transmitted.

For PUCCH or SRS, the transmit power $\hat{P}_{PUCCH}(i)$, defined in subclause 5.1.1.1, or $\hat{P}_{SRS,c}(i)$ is split equally across the configured antenna ports for PUCCH or SRS. $\hat{P}_{SRS,c}(i)$ is the linear value of $P_{SRS,c}(i)$ defined in subclause 5.1.3.

A cell wide overload indicator (OI) and a High Interference Indicator (HII) to control UL interference are defined in [9].

For a serving cell with frame structure type 1, a UE is not expected to be configured with UplinkPowerControlDedicated-v12x0.

5.1.1 Physical uplink shared channel

If the UE is configured with a SCG, the UE shall apply the procedures described in this clause for both MCG and SCG
- When the procedures are applied for MCG, the terms 'secondary cell', 'secondary cells', 'serving cell', 'serving cells' in this clause refer to secondary cell, secondary cells, serving cell, serving cells belonging to the MCG respectively.
- When the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.

If the UE is configured with a PUCCH-SCell, the UE shall apply the procedures described in this clause for both primary PUCCH group and secondary PUCCH group
- When the procedures are applied for primary PUCCH group, the terms 'secondary cell', 'secondary cells', 'serving cell', 'serving cells' in this clause refer to secondary cell, secondary cells, serving cell, serving cells belonging to the primary PUCCH group respectively.
- When the procedures are applied for secondary PUCCH group, the terms 'secondary cell', 'secondary cells', 'serving cell', 'serving cells' in this clause refer to secondary cell, secondary cells, serving cell, serving cells belonging to the secondary PUCCH group respectively.

5.1.1.1 UE Behaviour

The setting of the UE Transmit power for a Physical Uplink Shared Channel (PUSCH) transmission is defined as follows.

If the UE transmits PUSCH without a simultaneous PUCCH for the serving cell c, then the UE transmit power $P_{PUSCH,c}(i)$ for PUSCH transmission in subframe i for the serving cell c is given by $$P_{PUSCH,c}(i) = \min\begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix} [dBm]$$

If the UE transmits PUSCH simultaneous with PUCCH for the serving cell c, then the UE transmit Power $P_{PUSCH,c}(i)$ for the PUSCH transmission in subframe i for the serving cell c is given by $$P_{PUSCH,c}(i) = \min\begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix} [dBm]$$

If the UE is not transmitting PUSCH for the serving cell c, for the accumulation of TPC command received with DCI format 3/3A for PUSCH, the UE shall assume that the UE transmit power $P_{PUSCH,c}(i)$ for the PUSCH transmission in subframe i for the serving cell c is computed by $$P_{PUSCH,c} = \min\{P_{CMAX,c}(i), P_{O\_PUSCH,c}(1) + \alpha_c(1) \cdot PL_c + f_c(i)\} \; [dBm]$$

where, $P_{CMAX,c}(i)$ is the configured UE transmit power defined in [6] in subframe i for serving cell c and $\hat{P}_{CMAX,c}(i)$ is the linear value of $P_{CMAX,c}(i)$. If the UE transmits PUCCH without PUSCH in subframe i for the serving cell c, for the accumulation of TPC command received with DCI format 3/3A for PUSCH, the UE shall assume $P_{CMAX,c}(i)$ as given by subclause 5.1.2.1. If the UE does not transmit PUCCH and PUSCH in subframe i for the serving cell c, for the accumulation of TPC command received with DCI format 3/3A for PUSCH, the UE shall compute $P_{CMAX,c}(i)$ assuming MPR=0 dB, A-MPR=0 dB, P-MPR=0 dB and ⊠ $T_c$=0 dB, where MPR, A-MPR, P-MPR and ⊠ $T_c$ are defined in [6].
$\hat{P}_{PUCCH}(i)$ is the linear value of $P_{PUCCH}(i)$ defined in subclause 5.1.2.1
$M_{PUSCH,c}(i)$ is the bandwidth of the PUSCH resource assignment expressed in number of resource blocks valid for subframe i and serving cell c.
If the UE is configured with higher layer parameter UplinkPowerControlDedicated-v12x0 for serving cell c and if subframe i belongs to uplink power control subframe set 2 as indicated by the higher layer parameter tpc-SubframeSet-r12,
  when j=0, $P_{O\_PUSCH,c}(0) = P_{O\_UE\_PUSCH,c,2}(0) + P_{O\_NOMINAL\_PUSCH,c,2}(0)$, where j=0 is used for PUSCH (re)transmissions corresponding to a semi-persistent grant. $P_{O\_UE\_PUSCH,c,2}(0)$ and $P_{O\_NOMINAL\_PUSCH,c,2}(0)$ are the parameters p0-UE_PUSCH-Persistent-SubframeSet2-r12 and p0-NominalPUSCH-Persistent-SubframeSet2-r12 respectively provided by higher layers, for each serving cell c.
  when j=1, $P_{O\_PUSCH,c}(1) = P_{O\_UE\_PUSCH,c,2}(1) + P_{O\_NOMINAL\_PUSCH,c,2}(1)$ where j=1 is used for PUSCH (re)transmissions corresponding to a dynamic scheduled grant. $P_{O\_UE\_PUSCH,c,2}(1)$ and $P_{O\_NOMINAL\_PUSCH,c,2}(1)$ are the parameters p0-UE-PUSCH-SubframeSet2-r12 and p0-NominalPUSCH-SubframeSet2-r12 respectively, provided by higher layers for serving cell c.
  when j=2, where $P_{O\_PUSCH,c}(2) = P_{O\_UE\_PUSCH,c}(2) + P_{O\_NOMINAL\_PUSCH,c}(2)$ where $P_{O\_UE\_PUSCH,c}(2) = 0$ and $P_{O\_NOMINAL\_PUSCH,c}(2) = P_{O\_PRE} + \Delta_{PREAMBLE\_Msg\ 3}$, where the parameter preambleInitialReceivedTargetPower [8] ($P_{O\_PRE}$) and $\Delta_{PREAMBLE\_Msg\ 3}$ are signalled from higher layers for serving cell c, where j=2 is used for PUSCH (re)transmissions corresponding to the random access response grant.

Otherwise $P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. For PUSCH (re)transmissions corresponding to a semi-persistent grant then j=0, for PUSCH (re)transmissions corresponding to a dynamic scheduled grant then j=1 and for PUSCH (re)transmissions corresponding to the random access response grant then j=2. $P_{O\_UE\_PUSCH,c}(2) = 0$ and $P_{O\_NOMINAL\_PUSCH,c}(2) = P_{O\_PRE} + \Delta_{PREAMBLE\_Msg3}$ where the parameter preambleInitialReceivedTargetPower [8] ($P_{O\_PRE}$) and $\Delta_{PREAMBLE\_Msg3}$ are signalled from higher layers for serving cell c.
If the UE is configured with higher layer parameter UplinkPowerControlDedicated-v12x0 for serving cell c and if subframe i belongs to uplink power control subframe set 2 as indicated by the higher layer parameter tpc-SubframeSet-r12,
For j=0 or 1, $\alpha_c(j) = \alpha_{c,2} \in \{0, 0.4, 0.5, 0.6, 0.7, 0.8, 0.9, 1\}$. $\alpha_{c,2}$ is the parameter alpha-SubframeSet2-r12 provided by higher layers for each serving cell c.
For j=2, $\alpha_c(j) = 1$.
Otherwise
For j=0 or 1, $\alpha_c \in \{0, 0.4, 0.5, 0.6, 0.7, 0.8, 0.9, 1\}$ is a 3-bit parameter provided by higher layers for serving cell c. For j=2, $\alpha_c(j) = 1$.
$PL_c$ is the downlink path loss estimate calculated in the UE for serving cell c in dB and $PL_c$=referenceSignalPower higher layer filtered RSRP, where referenceSignalPower is provided by higher layers and RSRP is defined in [5] for the reference serving cell and the higher layer filter configuration is defined in [11] for the reference serving cell.
  If serving cell c belongs to a TAG containing the primary cell then, for the uplink of the primary cell, the primary cell is used as the reference serving cell for determining referenceSignalPower and higher layer filtered RSRP. For the uplink of the secondary cell, the serving cell configured by the higher layer parameter pathlossReferenceLinking defined in [11] is used as the reference serving cell for determining referenceSignalPower and higher layer filtered RSRP.

If serving cell c belongs to a TAG containing the PSCell then, for the uplink of the PSCell, the PSCell is used as the reference serving cell for determining referenceSignalPower and higher layer filtered RSRP; for the uplink of the secondary cell other than PSCell, the serving cell configured by the higher layer parameter pathlossReferenceLinking defined in [11] is used as the reference serving cell for determining referenceSignalPower and higher layer filtered RSRP.

If serving cell c belongs to a TAG not containing the primary cell or PSCell then serving cell c is used as the reference serving cell for determining referenceSignalPower and higher layer filtered RSRP.

$\Delta_{TF,c}(i)=10 \log_{10}((2^{BPRE \cdot K_S}-1) \cdot \beta_{offset}^{PUSCH})$ for $K_S=1.25$ and 0 for $K_S=0$ where $K_S$ is given by the parameter deltaMCS-Enabled provided by higher layers for each serving cell c. BPRE and $\beta_{offset}^{PUSCH}$, for each serving cell c, are computed as below. $K_S=0$ for transmission mode 2.

BPRE=$^\circ O_{CQI}/N_{RE}$ for control data sent via PUSCH without UL-SCH data and $$\sum_{r=0}^{C-1} K_r / N_{RE}$$

for other cases.

where C is the number of code blocks, $K_r$ is the size for code block r, $O_{OCI}$ is the number of CQI/PMI bits including CRC bits and $N_{RE}$ is the number of resource elements determined as $N_{RE}=M_{sc}^{PUSCH\text{-}inital} \cdot N_{symb}^{PUSCH\text{-}initial}$, where C, $K_r$, $M_{sc}^{PUSCH\text{-}initial}$ and $N_{symb}^{PUSCH\text{-}initial}$ are defined in [4].

$\beta_{offset}^{PUSCH} = \beta_{offset}$ for control data sent via PUSCH without UL-SCH data and 1 for other cases.

$\delta_{PUSCH,c}$ is a correction value, also referred to as a TPC command and is included in PDCCH/EPDCCH with DCI format 0/4 or in MPDCCH with DCI format 6-0A for serving cell c or jointly coded with other TPC commands in PDCCH/MPDCCH with DCI format 3/3A whose CRC parity bits are scrambled with TPC-PUSCH-RNTI. If the UE is configured with higher layer parameter UplinkPowerControlDedicated-v12x0 for serving cell c and if subframe i belongs to uplink power control subframe set 2 as indicated by the higher layer parameter tpc-SubframeSet-r12, the current PUSCH power control adjustment state for serving cell c is given by $f_{c,2}(i)$, and the UE shall use $f_{c,2}(i)$ instead of $f_c(i)$ to determine $P_{PUSCH,c}(i)$. Otherwise, the current PUSCH power control adjustment state for serving cell c is given by $f_c(i)$. $f_{c,2}(i)$ and $f_c(i)$ are defined by:

$f_c(i)=f_c(i-1)+\delta_{PUSCH,c}(i-K_{PUSCH})$ and $f_{c,2}(i)=f_{c,2}+\delta_{PUSCH,c}(i-K_{PUSCH})$ if accumulation is enabled based on the parameter Accumulation-enabled provided by higher layers or if the TPC command $\delta_{PUSCH,c}$ is included in a PDCCH/EPDCCH with DCI format 0 or in a MPDCCH with DCI format 6-0A for serving cell c where the CRC is scrambled by the Temporary C-RNTI where $\delta_{PUSCH,c}(i-K_{PUSCH})$ was signalled on PDCCH/EPDCCH with DCI format 0/4 or MPDCCH with DCI format 6-0A or PDCCH/MPDCCH with DCI format 3/3A on subframe $i-K_{PUSCH}$ and where $f_c(0)$ is the first value after reset of accumulation. For a BL/CE UE configured with CEModeA, subframe $i-K_{PUSCH}$ is the last subframe in which the MPDCCH with DCI format 6-0A or MPDCCH with DCI format 3/3A is transmitted.

The value of $K_{PUSCH}$ is
For FDD or FDD-TDD and serving cell frame structure type 1, $K_{PUSCH}=4$
For TDD, if the UE is configured with more than one serving cell and the TDD UL/DL configuration of at least two configured serving cells is not the same, or if the UE is configured with the parameter EIMTA-MainConfigServCell-r12 for at least one serving cell, or for FDD-TDD and serving cell frame structure type 2, the "TDD UL/DL configuration" refers to the UL-reference UL/DL configuration (defined in subclause 8.0) for serving cell c.

For TDD UL/DL configurations 1-6, $K_{PUSCH}$ is given in Table 5.1.1.1-1

For TDD UL/DL configuration 0
If the PUSCH transmission in subframe 2 or 7 is scheduled with a PDCCH/EPDCCH of DCI format 0/4 or a MPDCCH of DCI format 6-0A in which the LSB of the UL index is set to 1, $K_{PUSCH}=7$
For all other PUSCH transmissions, $K_{PUSCH}$ is given in Table 5.1.1.1-1.

For serving cell c and a non-BL/CE UE, the UE attempts to decode a PDCCH/EPDCCH of DCI format 0/4 with the UE's C-RNTI or DCI format 0 for SPS C-RNTI and a PDCCH of DCI format 3/3A with this UE's TPC-PUSCH-RNTI in every subframe except when in DRX or where serving cell c is deactivated.

For serving cell c and a BL/CE UE configured with CEModeA, the UE attempts to decode a MPDCCH of DCI format 6-0A with the UE's C-RNTI or SPS C-RNTI and a MPDCCH of DCI format 3/3A with this UE's TPC-PUSCH-RNTI in every BL/CE downlink subframe except when in DRX For a non-BL/CE UE, if DCI format 0/4 for serving cell c and DCI format 3/3A are both detected in the same subframe, then the UE shall use the $S_{PUSCH,c}$ provided in DCI format 0/4.

For a BL/CE UE configured with CEModeA, if DCI format 6-0A for serving cell c and DCI format 3/3A are both detected in the same subframe, then the UE shall use the $\delta_{PUSCH,c}$ provided in DCI format 6-0A.

$\delta_{PUSCH,c}=0$ dB for a subframe where no TPC command is decoded for serving cell c or where DRX occurs or i is not an uplink subframe in TDD or FDD-TDD and serving cell c frame structure type 2.

The $\delta_{PUSCH,c}$ dB accumulated values signalled on PDCCH/EPDCCH with DCI format 0/4 or MPDCCH with DCI format 6-0A are given in Table 5.1.1.1-2. If the PDCCH/EPDCCH with DCI format 0 or MPDCCH with DCI format 6-0A is validated as a SPS activation or release PDCCH/EPDCCH/MPDCCH, then $S_{PUSCH,c}$ is 0 dB.

The $\delta_{PUSCH}$ dB accumulated values signalled on PDCCH/MPDCCH with DCI format 3/3A are one of SET1 given in Table 5.1.1.1-2 or SET2 given in Table 5.1.1.1-3 as determined by the parameter TPC-Index provided by higher layers.

If UE has reached $P_{CMAX,c}(i)$ for serving cell c, positive TPC commands for serving cell c shall not be accumulated If UE has reached minimum power, negative TPC commands shall not be accumulated If the UE is not configured with higher layer parameter UplinkPowerControlDedicated-v12x0 for serving cell c, the UE shall reset accumulation
- For serving cell c, when $P_{O\_UE\_PUSCH,c}$ value is changed by higher layers
- For serving cell c, when the UE receives random access response message for serving cell c If the UE is configured with higher layer parameter UplinkPowerControlDedicated-v12x0 for serving cell c,
- the UE shall reset accumulation corresponding to $f_c(*)$ for serving cell c
  - when $P_{O\_UE\_PUSCH,c}$ value is changed by higher layers
  - when the UE receives random access response message for serving cell c
- the UE shall reset accumulation corresponding to $f_{c,2}(*)$ for serving cell c
  - when $P_{O\_UE\_PUSCH,c,2}$ value is changed by higher layers If the UE is configured with higher layer parameter UplinkPowerControlDedicated-v12x0 for serving cell c and
- if subframe i belongs to uplink power control subframe set 2 as indicated by the higher layer parameter tpc-SubframeSet-r12 $f_c(i)=1$)
- if subframe i does not belong to uplink power control subframe set 2 as indicated by the higher layer parameter tpc-SubframeSet-r12 $f_{c,2}(i)=f_{c,2}(i-1)$ $f_c(i)=\delta_{PUSCH,c}(i-K_{PUSCH})$ and $f_{c,2}(i)=\delta_{PUSCH,c}(i-K_{PUSCH})$ if accumulation is not enabled for serving cell c based on the parameter Accumulation-enabled provided by higher layers
  where $\delta_{PUSCH,c}(i-K_{PUSCH})$ was signalled on PDCCH/EPDCCH with DCI format 0/4 or MPDCCH with DCI format 6-0A for serving cell c on subframe $i-K_{PUSCH}$. For a BL/CE UE configured with CEModeA, subframe $i-K_{PUSCH}$ is the last subframe in which the MPDCCH with DCI format 6-0A or MPDCCH with DCI format 3/3A is transmitted.

The value of $K_{PUSCH}$ is
- For FDD or FDD-TDD and serving cell frame structure type 1, $K_{PUSCH}=4$
- For TDD, if the UE is configured with more than one serving cell and the TDD UL/DL configuration of at least two configured serving cells is not the same, or if the UE is configured with the parameter EIMTA-MainConfigServCell-r12 for at least one serving cell, or FDD-TDD and serving cell frame structure type 2, the "TDD UL/DL configuration" refers to the UL-reference UL/DL configuration (defined in subclause 8.0) for serving cell c.
- For TDD UL/DL configurations 1-6, $K_{PUSCH}$ is given in Table 5.1.1.1-1.
- For TDD UL/DL configuration 0
  - If the PUSCH transmission in subframe 2 or 7 is scheduled with a PDCCH/EPDCCH of DCI format 0/4 or a MPDCCH with DCI format 6-0A in which the LSB of the UL index is set to 1, $K_{PUSCH}=7$
  - For all other PUSCH transmissions, $K_{PUSCH}$ is given in Table 5.1.1.1-1.

The $\delta_{PUSCH,c}$ dB absolute values signalled on PDCCH/EPDCCH with DCI format 0/4 or a MPDCCH with DCI format 6-0A are given in Table 5.1.1.1-2. If the PDCCH/EPDCCH with DCI format 0 or a MPDCCH with DCI format 6-0A is validated as a SPS activation or release PDCCH/EPDCCH/MPDCCH, then $\delta_{PUSCH,c}$ is 0 dB.

for a non-BL/CE UE, $f_c(i)=f_c(i-1)$ and $f_{c,2}(i)=(i-1)$ for a subframe where no PDCCH/EPDCCH with DCI format 0/4 is decoded for serving cell c or where DRX occurs or i is not an uplink subframe in TDD or FDD-TDD and serving cell c frame structure type 2.

for a BL/CE UE configured with CEModeA, $f_c(i)=f_c(i-1)$ and $f_{c,2}(i)=f_{c,2}(i-1)$ for a subframe where no MPDCCH with DCI format 6-0A is decoded for serving cell c or where DRX occurs or i is not an uplink subframe in TDD.

If the UE is configured with higher layer parameter UplinkPowerControlDedicated-v12x0 for serving cell c and
- if subframe i belongs to uplink power control subframe set 2 as indicated by the higher layer parameter tpc-SubframeSet-r12 $f_c(i)=_c(i-1)$
- if subframe i does not belong to uplink power control subframe set 2 as indicated by the higher layer parameter tpc-SubframeSet-r12 $f_{c,2}(i)=f_{c,2}(i-1)$ For both types of $f_c(*)$ (accumulation or current absolute) the first value is set as follows:

If $P_{O\_UE\_PUSCH,c}$ value is changed by higher layers and serving cell c is the primary cell or, if $P_{O\_UE\_PUSCH,c}$ value is received by higher layers and serving cell c is a Secondary cell
  $f_c(0)=0$
Else
  If the UE receives the random access response message for a serving cell c
    $f_c(0)=\Delta P_{rampup,c}+\delta_{msg2,c}$, where
    $\delta_{msg2,c}$ is the TPC command indicated in the random access response corresponding to the random access preamble transmitted in the serving cell c, see subclause 6.2, and $$\Delta P_{rampup,c} = \min\left\{\left[\max\left(0, P_{CMAX,c} - \left(\begin{array}{c} 10\log_{10}(M_{PUSCH,c}(0)) \\ +P_{O\_PUSCH,c}(2) + \delta_{msg2} \\ +\alpha_c(2) \cdot PL + \Delta_{TF,c}(0) \end{array}\right)\right)\right], \Delta P_{rampuprequested,c}\right\}$$

and $\Delta P_{rampuprequested,c}$ is provided by higher layers and corresponds to the total power ramp-up requested by higher layers from the first to the last preamble in the serving cell c, $M_{PUSCH,c}$ (C) is the bandwidth of the PUSCH resource assignment expressed in number of resource blocks valid for the subframe of first PUSCH transmission in the serving cell c, and $\Delta_{TF,c}(0)$ is the power adjustment of first PUSCH transmission in the serving cell c.

If $P_{O\_UE\_PUSCH,c,2}$ value is received by higher layers for a serving cell c.
  $f_{c,2}(0)=0$

[Table 5.1.1.1-1 of 3GPP TS 36.213 v13.1.1, entitled "$K_{PUSCH}$ for TDD configuration 0-6", is reproduced as FIG. 6]

[Table 5.1.1.1-2 of 3GPP TS 36.213 v13.1.1, entitled "Mapping of TPC Command Field in DCI format 0/3/4 to absolute and accumulated $\delta_{PUSCH,c}$ values", is reproduced as FIG. 7]

[Table 5.1.1.1-3 of 3GPP TS 36.213 v13.1.1, entitled "Mapping of TPC Command Field in DCI format 3A to accumulated $\delta_{PUSCH,c}$ values", is reproduced as FIG. 8]

[ . . . ]

5.1.2 Physical Uplink Control Channel

If the UE is configured with a SCG, the UE shall apply the procedures described in this subclause for both MCG and SCG.

When the procedures are applied for MCG, the term 'serving cell' in this subclause refers to serving cell belonging to the MCG.

When the procedures are applied for SCG, the term 'serving cell' in this subclause refers to serving cell belonging to the SCG. The term 'primary cell' in this subclause refers to the PSCell of the SCG. If the UE is configured with a PUCCH-SCell, the UE shall apply the procedures described in this subclause for both primary PUCCH group and secondary PUCCH group.

When the procedures are applied for the primary PUCCH group, the term 'serving cell' in this subclause refers to serving cell belonging to the primary PUCCH group.

When the procedures are applied for the secondary PUCCH group, the term 'serving cell' in this subclause refers to serving cell belonging to the secondary PUCCH group. The term 'primary cell' in this subclause refers to the PUCCH-SCell of the secondary PUCCH group.

5.1.2.1 UE Behaviour

If serving cell c is the primary cell, for PUCCH format 1/1a/1b/2/2a/2b/3, the setting of the UE Transmit power $P_{PUCCH}$ for the physical uplink control channel (PUCCH) transmission in subframe i for serving cell c is defined by $$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array}\right\} [dBm]$$

If serving cell c is the primary cell, for PUCCH format 4/5, the setting of the UE Transmit power $P_{PUCCH}$ for the physical uplink control channel (PUCCH) transmission in subframe i for serving cell c is defined by $$P_{PUCCH}(i) = \min\left\{\begin{array}{l} P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i) \end{array}\right\} [dBm]$$

If the UE is not transmitting PUCCH for the primary cell, for the accumulation of TPC command for PUCCH, the UE shall assume that the UE transmit power $P_{PUCCH}$ for PUCCH in subframe i is computed by $$P_{PUCCH}(i) = \min\{P_{CMAX,c}(i), P_{O\_PUCCH} + PL_c + g(i)\}[dBm]$$

where $P_{CMAX,c}(i)$ is the configured UE transmit power defined in [6] in subframe i for serving cell c. If the UE transmits PUSCH without PUCCH in subframe i for the serving cell c, for the accumulation of TPC command for PUCCH, the UE shall assume $P_{CMAX,c}(i)$ as given by subclause 5.1.1.1. If the UE does not transmit PUCCH and PUSCH in subframe i for the serving cell c, for the accumulation of TPC command for PUCCH, the UE shall compute $P_{CMAX,c}(i)$ assuming MPR=0 dB, A-MPR=0 dB, P-MPR=0 dB and ⌊$T_C$=0 dB, where MPR, A-MPR, P-MPR and ⌊$T_c$ are defined in [6].

The parameter $\Delta_{F\_PUCCH}$ (F) is provided by higher layers. Each $\Delta_{F\_PUCCH}$ (F) value corresponds to a PUCCH format (F) relative to PUCCH format 1a, where each PUCCH format (F) is defined in Table 5.4-1 of [3].

If the UE is configured by higher layers to transmit PUCCH on two antenna ports, the value of $\Delta_{TxD}$ (F') is provided by higher layers where each PUCCH format F' is defined in Table 5.4-1 of [3]; otherwise, $\Delta_{TxD}$(F')=0.

$h(n_{CQI}, n_{HARQ}, n_{SR})$ is a PUCCH format dependent value, where $n_{CQI}$ corresponds to the number of information bits for the channel quality information defined in subclause 5.2.3.3 in [4]. $n_{SR}$=1 if subframe i is configured for SR for the UE not having any associated transport block for UL-SCH, otherwise $n_{SR}$=0. If the UE is configured with more than one serving cell, or the UE is configured with one serving cell and transmitting using PUCCH format 3, the value of $n_{HARQ}$ is defined in subclause 10.1; otherwise, $n_{HARQ}$ is the number of HARQ-ACK bits sent in subframe i.

For PUCCH format 1, 1a and 1b $h(n_{CQI}, n_{HARQ}, n_{SR})$=0

For PUCCH format 1b with channel selection, if the UE is configured with more than one serving cell, $$h(n_{CQI}, n_{HARQ}, n_{SR}) = \frac{(n_{HARQ} - 1)}{2},$$

otherwise, $h(n_{CQI}, n_{HARQ}, n_{SR})$=0

For PUCCH format 2, 2a, 2b and normal cyclic prefix $$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases}$$

For PUCCH format 2 and extended cyclic prefix $$h(n_{CQI}, n_{HARQ}, n_{SR}) = \begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}$$

For PUCCH format 3 and when UE transmits HARQ-ACK/SR without periodic CSI,

If the UE is configured by higher layers to transmit PUCCH format 3 on two antenna ports, or if the UE transmits more than 11 bits of HARQ-ACK/SR $$h(n_{CQI}, n_{HARQ}, n_{SR}) = \frac{n_{HARQ} + n_{SR} - 1}{3}$$

Otherwise $$h(n_{CQI}, n_{HARQ}, n_{SR}) = \frac{n_{HARQ} + n_{SR} - 1}{2}$$

For PUCCH format 3 and when UE transmits HARQ-ACK/SR and periodic CSI,

If the UE is configured by higher layers to transmit PUCCH format 3 on two antenna ports, or if the UE transmits more than 11 bits of HARQ-ACK/SR and CSI $$h(n_{CQI}, n_{HARQ}, n_{SR}) = \frac{n_{HARQ} + n_{SR} + n_{CQI} - 1}{3}$$

Otherwise $$h(n_{CQI}, n_{HARQ}, n_{SR}) = \frac{n_{HARQ} + n_{SR} + n_{CQI} - 1}{2}$$

For PUCCH format 4, $M_{PUCCH,c}(i)$ is the bandwidth of the PUCCH format 4 expressed in number of resource blocks valid for subframe i and serving cell c. For PUCCH format 5, $M_{PUCCH,c}(i)=1$.

$\Delta_{TF,c}(i)=10\log_{10}(2^{1.25 \cdot BPRE(i)}-1)$ where $BPRE(i)=o_{UCI}(i)/N_{RE}(i)$, $o_{UCI}(i)$ is the number of HARQ-ACK/SR/RI/CQI/PMI bits including CRC bits transmitted on PUCCH format 4/5 in subframe i;

$N_{RB}(i)=M_{PUCCH,c}(i) \cdot N_{sc}^{RB} \cdot N_{symb}^{PUCCH}$ for PUCCH format 4 and $N_{RE}(i)=N_{sc}^{PUCCH}/2$ for PUCCH format 5; $N_{symb}^{PUCCH}=2 \cdot (N_{symb}^{UL}-1)-1$ if shortened PUCCH format 4 or shortened PUCCH format 5 is used in subframe i and $N_{symb}^{PUCCH}=2 \cdot (N_{symb}^{UL}-1)$ otherwise.

$P_{O\_PUCCH}$ is a parameter composed of the sum of a parameter $P_{O\_NOMINAL\_PUCCH}$ provided by higher layers and a parameter $P_{O\_UE\_PUCCH}$ provided by higher layers.

$\delta_{PUCCH}$ is a UE specific correction value, also referred to as a TPC command, included in a PDCCH with DCI format 1A/1B/1D/1/2A/2/2B/2C/2D for the primary cell, or included in a MPDCCH with DCI format 6-1A, or included in an EPDCCH with DCI format 1A/1B/1D/1/2A/2/2B/2C/2D for the primary cell, or sent jointly coded with other UE specific PUCCH correction values on a PDCCH/MPDCCH with DCI format 3/3A whose CRC parity bits are scrambled with TPC-PUCCH-RNTI.

For a non-BL/CE UE, if the UE is not configured for EPDCCH monitoring, the UE attempts to decode a PDCCH of DCI format 3/3A with the UE's TPC-PUCCH-RNTI and one or several PDCCHs of DCI format 1A/1B/1D/1/2A/2/2B/2C/2D with the UE's C-RNTI or SPS C-RNTI on every subframe except when in DRX.

If a UE is configured for EPDCCH monitoring, the UE attempts to decode
  a PDCCH of DCI format 3/3A with the UE's TPC-PUCCH-RNTI and one or several PDCCHs of DCI format 1A/1B/1D/1/2A/2/2B/2C/2D with the UE's C-RNTI or SPS C-RNTI as described in subclause 9.1.1, and
  one or several EPDCCHs of DCI format 1A/1B/1D/1/2A/2/2B/2C/2D with the UE's C-RNTI or SPS C-RNTI, as described in subclause 9.1.4.

For a BL/CE UE configured with CEModeA, the UE attempts to decode a MPDCCH of DCI format 3/3A with the UE's TPC-PUCCH-RNTI and MPDCCH of DCI format 6-1A with the UE's C-RNTI or SPS C-RNTI on every BL/CE downlink subframe except when in DRX.

If the UE decodes
  a PDCCH with DCI format 1A/1B/1D/1/2A/2/2B/2C/2D or
  an EPDCCH with DCI format 1A/1B/1D/1/2A/2/2B/2C/2D or
  an MPDCCH with DCI format 6-1A
  for the primary cell and the corresponding detected RNTI equals the C-RNTI or SPS C-RNTI of the UE and the TPC field in the DCI format is not used to determine the PUCCH resource as in subclause 10.1, the UE shall use the $\delta_{PUCCH}$ provided in that PDCCH/EPDCCH/M PDCCH.
Else
  if the UE decodes a PDCCH/MPDCCH with DCI format 3/3A, the UE shall use the $\delta_{PUCCH}$ provided in that PDCCH/MPDCCH
  else the UE shall set $\delta_{PUCCH}$=0 dB.

$$g(i) = g(i-1) + \sum_{m=0}^{M-1} \delta_{PUCCH}(i-k_m)$$

where g(i) is the current PUCCH power control adjustment state and where g(0) is the first value after reset.

For FDD or FDD-TDD and primary cell frame structure type 1, M=1 and $k_0$=4.

For TDD, values of M and $k_m$ are given in Table 10.1.3.1-1, where the "UL/DL configuration" in Table 10.1.3.1-1 corresponds to the eimta-HARQ-ReferenceConfig-r12 for the primary cell when the UE is configured with the parameter EIMTA-MainConfigServCell-r12 for the primary cell.

The $\delta_{PUCCH}$ dB values signalled on PDCCH with DCI format 1A/1B/1D/1/2A/2/2B/2C/2D or EPDCCH with DCI format 1A/1B/1D/1/2A/2/2B/2C/2D or MPDCCH with DCI format 6-1A are given in Table 5.1.2.1-1. If the PDCCH with DCI format 1/1A/2/2A/2B/2C/2D or EPDCCH with DCI format 1/1A/2A/2/2B/2C/2D or MPDCCH with DCI format 6-1A is validated as an SPS activation PDCCH/EPDCCH/MPDCCH, or the PDCCH/EPDCCH with DCI format 1A or MPDCCH with DCI format 6-1A is validated as an SPS release PDCCH/EPDCCH/MPDCCH, then $\delta_{PUCCH}$ is 0 dB.

The $\delta_{PUCCH}$ dB values signalled on PDCCH/MPDCCH with DCI format 3/3A are given in Table 5.1.2.1-1 or in Table 5.1.2.1-2 as semi-statically configured by higher layers.

If $P_{O\_UE\_PUCCH}$ value is changed by higher layers,
  g(0)=0
Else
  g(0)=$\Delta P_{rampup}$+$\delta_{msg2}$, where
    $\delta_{msg2}$ is the TPC command indicated in the random access response corresponding to the random access preamble transmitted in the primary cell, see subclause 6.2 and
    if UE is transmitting PUCCH in subframe i, $$\Delta P_{rampup} = \min\left[\left\{\max\left(0, P_{CMAX,c} - \left(\begin{array}{c}P_{0\_PUCCH}\\+PL_c + h(n_{CQI}, n_{HARQ}, n_{SR})\\+\Delta_{F\_PUCCH}(F)+\Delta_{TxD}(F')\end{array}\right)\right)\right\},\right.$$
$$\left.\Delta P_{rampuprequested}\right]$$

Otherwise,
$\Delta P_{rampup}$=min[{max(0,$P_{CMAX,c}$−($P_{0\_PUCCH}$+ PL))};$\Delta P_{rampuprequested}$] and
$\Delta P_{rampuprequested}$ is provided by higher layers and corresponds to the total power ramp-up requested by higher layers from the first to the last preamble in the primary cell.

If UE has reached $P_{CMAX,c}(i)$ for the primary cell, positive TPC commands for the primary cell shall not be accumulated.

If UE has reached minimum power, negative TPC commands shall not be accumulated.

UE shall reset accumulation when $P_{O\_UE\_PUCCH}$ value is changed by higher layers when the UE receives a random access response message for the primary cell $g(i)=g(i-1)$ if i is not an uplink subframe in TDD or FDD-TDD and primary cell frame structure type 2.

For a BL/CE UE configured with CEModeA, if the PUCCH is transmitted in more than one subframe $i_0, i_1, \ldots, i_{N-1}$ where $i_0<i_1<\ldots<i_{N-1}$, the PUCCH transmit power in subframe $i_k$, k=0, 1, ..., N-1 is determined by $$P_{UCCH,c}(i_k)=P_{PUCCH,c}(i_0)$$

For a BL/CE UE configured with CEModeB, the PUCCH transmit power in subframe $i_k$ is determined by $$P_{PUCCH,c}(i_k)=P_{CMAX,c}(i_0)$$

[Table 5.1.2.1-1 of 3GPP TS 36.213 v13.1.1, entitled "Mapping of TPC Command Field in DCI format 1A/1B/1D/1/2A/2B/2C/2D/2/3 to $\delta_{PUCCH}$ values", is reproduced as FIG. 9]

[Table 5.1.2.1-2 of 3GPP TS 36.213 v13.1.1, entitled "Mapping of TPC Command Field in DCI format 3A to $\delta_{PUCCH}$ values", is reproduced as FIG. 10]

5.1.3 Sounding Reference Symbol (SRS)

5.1.3.1 UE Behaviour

The setting of the UE Transmit power $P_{SRS}$ for the SRS transmitted on subframe i for serving cell c is defined by $$P_{SRS,c}(i)=\min\{P_{CMAX,c}(i),P_{SRS\_OFFSET,c}(m)+10\log_{10}(M_{SRS,c})+P_{O\_PUSCH,c}(j)+\alpha_c(j)\cdot PL_c(i)\}[dBm]$$

where $P_{CMAX,c}(i)$ is the configured UE transmit power defined in [6] in subframe i for serving cell c.

$P_{SRS\_OFFSET,c}(m)$ is semi-statically configured by higher layers for m=0 and m=1 for serving cell c. For SRS transmission given trigger type 0 then m=0 and for SRS transmission given trigger type 1 then m=1.

$M_{SRS,c}$ is the bandwidth of the SRS transmission in subframe i for serving cell c expressed in number of resource blocks.

$f_c(i)$ is the current PUSCH power control adjustment state for serving cell c, see subclause 5.1.1.1.

$P_{O\_PUSCH,c}(j)$ and $\alpha_c(j)$ are parameters as defined in subclause 5.1.1.1 for subframe where j=1.

If the UE is not configured with an SCG or a PUCCH-SCell, and if the total transmit power of the UE for the Sounding Reference Symbol in an SC-FDMA symbol would exceed $\hat{P}_{CMAX}(i)$, the UE scales $\hat{P}_{SRS,c}(i)$ for the serving cell c and the SC-FDMA symbol in subframe i such that the condition $$\sum_c w(i)\cdot\hat{P}_{SRS,c}(i) \le \hat{P}_{CMAX}(i)$$

is satisfied where $\hat{P}_{SRS,c}(i)$ is the linear value of $P_{SRS,c}(i)$, $\hat{P}_{CMAX}(i)$ is the linear value of $P_{CMAX}$ defined in [6] in subframe i and w(i) is a scaling factor of $\hat{P}_{SRS,c}(i)$ for serving cell c where $0<w(i)\le1$. Note that w(i) values are the same across serving cells.

If the UE is not configured with an SCG or a PUCCH-SCell, and if the UE is configured with multiple TAGs and the SRS transmission of the UE in an SC-FDMA symbol for a serving cell in subframe i in a TAG overlaps with the SRS transmission in another SC-FDMA symbol in subframe i for a serving cell in another TAG, and if the total transmit power of the UE for the Sounding Reference Symbol in the overlapped portion would exceed $\hat{P}_{CMAX}(i)$, the UE scales $\hat{P}_{SRS,c}(i)$ for the serving cell c and each of the overlapped SRS SC-FDMA symbols in subframe i such that the condition $$\sum_c w(i)\cdot\hat{P}_{SRS,c}(i) \le \hat{P}_{CMAX}(i)$$

is satisfied where $\hat{P}_{SRS,c}(i)$ is the linear value of $P_{SRS,c}(i)$, $\hat{P}_{CMAX}(i)$ is the linear value of $P_{CMAX}$ defined in [6] in subframe i and w(i) is a scaling factor of $\hat{P}_{SRS,c}(i)$ for serving cell c where $0<w(i)\le1$. Note that w(i) values are the same across serving cells.

If the UE is configured with higher layer parameter UplinkPowerControlDedicated-v12x0 for serving cell c and if subframe i belongs to uplink power control subframe set 2 as indicated by the higher layer parameter tpc-SubframeSet-r12, the UE shall use $f_{c,2}(i)$ instead of $f_c(i)$ to determine $P_{SRS,c}(i)$ for subframe i and serving cell c, where $f_{c,2}(i)$ is defined in subclause 5.1.1.1.

Channel state information (CSI) may comprise channel quality indicator (CQI), PMI (precoding matrix indicator), RI (rank indicator). The CSI measurement is measured from CRS or CSI-RS. As can be seen from the below quotations, CQI is an indicator of affordable modulation and coding scheme under certain assumptions, e.g., error rate target, channel condition, which is a kind of implicit feedback for the channel, which can be determined by, for example, signal to interference and noise ratio (SINR) of certain signal. Alternatively, CQI can also be used to indicate real channel coefficient, with possible quantization. PMI is an indicator of preferred precoding matrix in the antenna domain, which can be used to enlarge the signal quality (beamforming gain), or reduce the interference between multiple streams (layers) from different antennas to a given UE. RI is an indicator of the preferred or affordable number of streams (layers) to the UE. More detail information can be found in Section 7.2 of 3GPP TS 36.213 as follows:

7.2 UE Procedure for Reporting Channel State Information (CSI)

If the UE is configured with a PUCCH-SCell, the UE shall apply the procedures described in this clause for both primary PUCCH group and secondary PUCCH group unless stated otherwise When the procedures are applied for the primary PUCCH group, the terms 'secondary cell', 'secondary cells', 'serving cell', and 'serving cells' in this clause refer to secondary cell, secondary cells, serving cell or serving cells belonging to the primary PUCCH group respectively unless stated otherwise.

When the procedures are applied for secondary PUCCH group, the terms 'secondary cell', 'secondary cells', 'serving cell' and 'serving cells' in this clause refer to secondary cell, secondary cells (not including the PUCCH-SCell), serving cell, serving cells belonging to the secondary PUCCH group respectively unless stated otherwise. The term 'primary cell' in this clause refers to the PUCCH-SCell of the secondary PUCCH group.

The time and frequency resources that can be used by the UE to report CSI which consists of Channel Quality Indicator (COI), precoding matrix indicator (PMI), precoding type indicator (PTI), CSI-RS resource indicator (CRI), and/or rank indication (RI) are controlled by the eNB. For spatial multiplexing, as given in [3], the UE shall determine a RI corresponding to the number of useful transmission layers. For transmit diversity as given in [3], RI is equal to one.

A non-BL/CE UE in transmission mode 8 or 9 is configured with or without PMI/RI reporting by the higher layer parameter pmi-RI-Report.

A UE in transmission mode 10 can be configured with one or more CSI processes per serving cell by higher layers.

For a UE in transmission mode 10,
  If a UE is not configured with higher layer parameter eMIMO-Type, each CSI process is associated with a CSI-RS resource (defined in subclause 7.2.5) and a CSI-interference measurement (CSI-IM) resource (defined in subclause 7.2.6). A UE can be configured with up to two CSI-IM resources for a CSI process if the UE is configured with CSI subframe sets $C_{CSI,0}$ and $C_{CSI,1}$ by the higher layer parameter csi-SubFramePattern-Config-r12 for the CSI process.
  If the UE is configured with higher layer parameter eMIMO-Type, and eMIMO-Type is set to 'CLASS A', each CSI process is associated with a CSI-RS resource (defined in subclause 7.2.5) and a CSI-interference measurement (CSI-IM) resource (defined in subclause 7.2.6). A UE can be configured with up to two CSI-IM resources for a CSI process if the UE is configured with CSI subframe sets $C_{CSO,0}$ and $C_{CSI,1}$ by the higher layer parameter csi-SubFramePatternConfig-r12 for the CSI process.
  If the UE is configured with higher layer parameter eMIMO-Type, and eMIMO-Type is set to 'CLASS B', each CSI process is associated with one or more CSI-RS resource (defined in subclause 7.2.5) and one or more CSI-interference measurement (CSI-IM) resource (defined in subclause 7.2.6). Each CSI-RS resource is associated with a CSI-IM resource by higher layers. For a CSI process with one CSI-RS resource, a UE can be configured with CSI-IM resource for each CSI subframe sets if the UE is configured with CSI subframe sets $C_{CSI,0}$ and $C_{CSI,1}$ by the higher layer parameter csi-SubFramePatternConfig-r12 for the CSI process.

For a UE in transmission mode 10, a CSI reported by the UE corresponds to a CSI process configured by higher layers. Each CSI process can be configured with or without PMI/RI reporting by higher layer signalling.

For UE in transmission mode 9 and the UE configured with higher layer parameter eMIMO-Type, the term 'CSI process' in this subclause refers to the CSI configured for the UE.

For a UE in transmission mode 9, and if the UE is configured with higher layer parameter eMIMO-Type, and,
  eMIMO-Type is set to 'CLASS A', each CSI process is associated with a CSI-RS resource (defined in subclause 7.2.5).
  eMIMO-Type is set to 'CLASS B', each CSI process is associated with one or more CSI-RS resource (defined in subclause 7.2.5).

For a CSI process, and if a UE is configured in transmission mode 9 or 10, and UE is not configured with higher layer parameter pmi-RI-Report, and UE is configured with higher layer parameter eMIMO-Type, and eMIMO-Type is set to 'CLASS B', and the number of CSI-RS antenna ports in at least one of the one or more configured CSI-RS resource is more than one, the UE is considered to be configured without PMI reporting.

A UE is configured with resource-restricted CSI measurements if the subframe sets $C_{CSI,0}$ and $C_{CSI,1}$ are configured by higher layers.

For a serving cell with frame structure type 1, a UE is not expected to be configured with csi-SubframePatternConfig-r12.

CSI reporting is periodic or aperiodic.

A BL/CE UE configured with CEModeB is not expected to be configured with either aperiodic CSI or periodic CSI reporting.

If the UE is configured with more than one serving cell, it transmits CSI for activated serving cell(s) only.

If a UE is not configured for simultaneous PUSCH and PUCCH transmission, it shall transmit periodic CSI reporting on PUCCH as defined hereafter in subframes with no PUSCH allocation.

If a UE is not configured for simultaneous PUSCH and PUCCH transmission, it shall transmit periodic CSI reporting on PUSCH of the serving cell with smallest ServCellIndex as defined hereafter in subframes with a PUSCH allocation, where the UE shall use the same PUCCH-based periodic CSI reporting format on PUSCH.

A UE shall transmit aperiodic CSI reporting on PUSCH if the conditions specified hereafter are met. For aperiodic CQI/PMI reporting, RI reporting is transmitted only if the configured CSI feedback type supports RI reporting.

Table 7.2-1: Void

In case both periodic and aperiodic CSI reporting would occur in the same subframe, the UE shall only transmit the aperiodic CSI report in that subframe.

If the higher layer parameter altCQI-Table-r12 is configured and is set to allSubframes-r12,
  the UE shall report CQI according to Table 7.2.3-2.
Else if the higher layer parameter altCQI-Table-r12 is configured and is set to csi-SubframeSet1-r12 or csi-SubframeSet2-r12,
  the UE shall report CQI according to Table 7.2.3-2 for the corresponding CSI subframe set configured by altCQI-Table-r12
  the UE shall report CQI for the other CSI subframe set according to Table 7.2.3-1.
Else
  the UE shall report CQI according to Table 7.2.3-1.
[ . . . ]

7.2.3 Channel Quality Indicator (CQI) Definition

The CQI indices and their interpretations are given in Table 7.2.3-1 for reporting CQI based on QPSK, 16QAM and 64QAM. The CQI indices and their interpretations are given in Table 7.2.3-2 for reporting CQI based on QPSK, 16QAM, 64QAM and 256QAM. The CQI indices and their interpretations are given in Table 7.2.3-3 for reporting CQI based on QPSK and 16QAM.

For a non-BL/CE UE, based on an unrestricted observation interval in time unless specified otherwise in this subclause, and an unrestricted observation interval in frequency, the UE shall derive for each CQI value reported in uplink subframe n the highest CQI index between 1 and 15 in Table 7.2.3-1 or Table 7.2.3-2 which satisfies the following condition, or CQI index 0 if CQI index 1 does not satisfy the condition:
  A single PDSCH transport block with a combination of modulation scheme and transport block size corresponding to the CQI index, and occupying a group of downlink physical resource blocks termed the CSI reference resource, could be received with a transport block error probability not exceeding 0.1.

For a BL/CE UE, based on an unrestricted observation interval in time and frequency, the UE shall derive for each CQI value the highest CQI index between 1 and 10 in Table 7.2.3-3 which satisfies the following condition, or CQI index 0 if CQI index 1 does not satisfy the condition:

A single PDSCH transport block with a combination of modulation scheme and transport block size corresponding to the CQI index, and occupying a group of downlink physical resource blocks termed the CSI reference resource, could be received with a transport block error probability not exceeding 0.1.

If CSI subframe sets $C_{CSI,0}$ and $C_{CSI,1}$ are configured by higher layers, each CSI reference resource belongs to either $C_{CSI,0}$ or $C_{CSI,1}$ but not to both. When CSI subframe sets $C_{CSI,0}$ and $C_{CSI,1}$ are configured by higher layers a UE is not expected to receive a trigger for which the CSI reference resource is in subframe that does not belong to either subframe set. For a UE in transmission mode 10 and periodic CSI reporting, the CSI subframe set for the CSI reference resource is configured by higher layers for each CSI process.

For a UE in transmission mode 9 when parameter pmi-RI-Report is configured by higher layers and parameter eMIMO-Type is not configured by higher layers, the UE shall derive the channel measurements for computing the CQI value reported in uplink subframe n based on only the Channel-State Information (CSI) reference signals (CSI-RS) defined in [3] for which the UE is configured to assume non-zero power for the CSI-RS. For a non-BL/CE UE in transmission mode 9 when the parameter pmi-RI-Report is not configured by higher layers or in transmission modes 1-8 the UE shall derive the channel measurements for computing CQI based on CRS. For a BL/CE UE the UE shall derive the channel measurements for computing CQI based on CRS.

For a UE in transmission mode 10, when parameter eMIMO-Type is not configured by higher layers, the UE shall derive the channel measurements for computing the CQI value reported in uplink subframe n and corresponding to a CSI process, based on only the non-zero power CSI-RS (defined in [3]) within a configured CSI-RS resource associated with the CSI process.

For a UE in transmission mode 9 and the UE configured with parameter eMIMO-Type by higher layers, the term 'CSI process' in this clause refers to the CSI configured for the UE.

For a UE in transmission mode 9 or 10 and for a CSI process, if the UE is configured with parameter eMIMO-Type by higher layers, and eMIMO-Type is set to 'CLASS A', and one CSI-RS resource configured, or the UE is configured with parameter eMIMO-Type by higher layers, and eMIMO-Type is set to 'CLASS B', and parameter channelMeasRestriction is not configured by higher layers, the UE shall derive the channel measurements for computing the CQI value reported in uplink subframe n and corresponding to the CSI process, based on only the non-zero power CSI-RS (defined in [3]) within a configured CSI-RS resource associated with the CSI process. IF the UE is configured with parameter eMIMO-Type by higher layers, and eMIMO-Type is set to 'CLASS B' and the number of configured CSI-RS resources is K>1, and parameter channelMeasRestriction is not configured by higher layers, the UE shall derive the channel measurements for computing the CQI value using only the configured CSI-RS resource indicated by the CRI.

For a UE in transmission mode 9 or 10 and for a CSI process, if the UE is configured with parameter eMIMO-Type by higher layers, and eMIMO-Type is set to 'CLASS B', and parameter channelMeasRestriction is configured by higher layers, the UE shall derive the channel measurements for computing the CQI value reported in uplink subframe n and corresponding to the CSI process, based on only the most recent, no later than the CSI reference resource, non-zero power CSI-RS (defined in [3]) within a configured CSI-RS resource associated with the CSI process. If the UE is configured with parameter eMIMO-Type by higher layers, and eMIMO-Type is set to 'CLASS B' and the number of configured CSI-RS resources is K>1, and parameter channelMeasRestriction is configured by higher layers, the UE shall derive the channel measurements for computing the CQI value using only the most recent, no later than the CSI reference resource, non-zero power CSI-RS within the configured CSI-RS resource indicated by the CRI.

For a UE in transmission mode 10, when parameter eMIMO-Type is not configured by higher layers, the UE shall derive the interference measurements for computing the CQI value reported in uplink subframe n and corresponding to a CSI process, based on only the configured CSI-IM resource associated with the CSI process.

For a UE in transmission mode 10 and for a CSI process, when parameters eMIMO-Type and interferenceMeasRestriction is configured by higher layers, the UE shall derive the interference measurements for computing the CQI value reported in uplink subframe n and corresponding to the CSI process, based on only the most recent, no later than the CSI reference resource, configured CSI-IM resource associated with the CSI process. If the UE is configured with parameter eMIMO-Type by higher layers, and eMIMO-Type is set to 'CLASS B' and the number of configured CSI-RS resources is K>1, and interferenceMeasRestriction is configured, the UE shall derive interference measurement for computing the CQI value based on only the most recent, no later than the CSI reference resource, the configured CSI-IM resource associated with the CSI-RS resource indicated by the CRI. If interferenceMeasRestriction is not configured, the UE shall derive the interference measurement for computing the CQI value based on the CSI-IM associated with the CSI-RS resource indicated by the CRI.

If the UE in transmission mode 10 is configured by higher layers for CSI subframe sets $C_{CSI,0}$ and $C_{CSI,1}$ for the CSI process, the configured CSI-IM resource within the subframe subset belonging to the CSI reference resource is used to derive the interference measurement.

For a UE configured with the parameter EIMTA-MainConfigServCell-r12 for a serving cell, configured CSI-IM resource(s) within only downlink subframe(s) of a radio frame that are indicated by UL/DL configuration of the serving cell can be used to derive the interference measurement for the serving cell.

For a LAA Scell,
for channel measurements, if the UE averages CRS/CSI-RS measurements from multiple subframes
the UE should not average CSI-RS measurement in subframe n1 with CSI-RS measurement in a later subframe n2, if any OFDM symbol of subframe n1 or any subframe from subframe n1+1 to subframe n2, is not occupied.
the UE should not average CRS measurement in subframe n1 with CRS measurement in a later subframe n2, if any OFDM symbol of the second slot of subframe n1 or any OFDM symbol of any subframe from subframe n1+1 to subframe n2−1, or any of the first 3 OFDM symbols in subframe n2, is not occupied.

for interference measurements, the UE shall derive the interference measurements for computing the CQI value based on only measurements in subframes with occupied OFDM symbols.

A combination of modulation scheme and transport block size corresponds to a CQI index if:

the combination could be signalled for transmission on the PDSCH in the CSI reference resource according to the relevant Transport Block Size table, and the modulation scheme is indicated by the CQI index, and the combination of transport block size and modulation scheme when applied to the reference resource results in the effective channel code rate which is the closest possible to the code rate indicated by the CQI index. If more than one combination of transport block size and modulation scheme results in an effective channel code rate equally close to the code rate indicated by the CQI index, only the combination with the smallest of such transport block sizes is relevant.

The CSI reference resource for a serving cell is defined as follows:

For a non-BL/CE UE, in the frequency domain, the CSI reference resource is defined by the group of downlink physical resource blocks corresponding to the band to which the derived CQI value relates. For a BL/CE UE, in the frequency domain, the CSI reference resource includes all downlink physical resource blocks for any of the narrowband to which the derived CQI value relates.

In the time domain and for a non-BL/CE UE, for a UE configured in transmission mode 1-9 or transmission mode 10 with a single configured CSI process for the serving cell, the CSI reference resource is defined by a single downlink or special subframe $n-n_{CQI\_ref}$.

where for periodic CSI reporting $n_{CQI\_ref}$ is the smallest value greater than or equal to 4, such that it corresponds to a valid downlink or valid special subframe, where for aperiodic CSI reporting, if the UE is not configured with the higher layer parameter csi-SubframePatternConfig-r12, $n_{CQI\_ref}$ is such that the reference resource is in the same valid downlink or valid special subframe as the corresponding CSI request in an uplink DCI format.

$n_{CQI\_ref}$ is equal to 4 and subframe $n-n_{CQI\_ref}$ corresponds to a valid downlink or valid special subframe, where subframe $n-n_{CQI\_ref}$ is received after the subframe with the corresponding CSI request in a Random Access Response Grant.

where for aperiodic CSI reporting, and the UE configured with the higher layer parameter csi-SubframePatternConfig-r12, for the UE configured in transmission mode 1-9, $n_{CQI\_ref}$ is the smallest value greater than or equal to 4 and subframe $n-n_{CQI\_ref}$ corresponds to a valid downlink or valid special subframe, where subframe $n-n_{CQI\_ref}$ is received on or after the subframe with the corresponding CSI request in an uplink DCI format;

$n_{CQI\_ref}$ is the smallest value greater than or equal to 4, and subframe $n-n_{CQI\_ref}$ corresponds to a valid downlink or valid special subframe, where subframe $n-n_{CQI\_ref}$ is received after the subframe with the corresponding CSI request in an Random Access Response Grant;

if there is no valid value for $n_{CQI\_ref}$ based on the above conditions, then $n_{CQI\_ref}$ is the smallest value such that the reference resource is in a valid downlink or valid special subframe $n-n_{CQI\_ref}$ prior to the subframe with the corresponding CSI request, where subframe $n-n_{CQI\_ref}$ is the lowest indexed valid downlink or valid special subframe within a radio frame;

for the UE configured in transmission mode 10, $n_{CQI\_ref}$ is the smallest value greater than or equal to 4, such that it corresponds to a valid downlink or valid special subframe, and the corresponding CSI request is in an uplink DCI format;

$n_{CQI\_ref}$ is the smallest value greater than or equal to 4, and subframe $n-n_{CQI\_ref}$ corresponds to a valid downlink or valid special subframe, where subframe $n-n_{CQI\_ref}$ is received after the subframe with the corresponding CSI request in a Random Access Response Grant;

for a UE configured in transmission mode 10 with multiple configured CSI processes for the serving cell, the CSI reference resource for a given CSI process is defined by a single downlink or special subframe $n-n_{CQI\_ref}$.

where for FDD serving cell and periodic or aperiodic CSI reporting $n_{CQI\_ref}$ is the smallest value greater than or equal to 5, such that it corresponds to a valid downlink or valid special subframe, and for aperiodic CSI reporting the corresponding CSI request is in an uplink DCI format;

where for FDD serving cell and aperiodic CSI reporting $n_{CQI\_ref}$ is equal to 5 and subframe $n-n_{CQI\_ref}$ corresponds to a valid downlink or valid special subframe, where subframe $n-n_{CQI\_ref}$ is received after the subframe with the corresponding CSI request in a Random Access Response Grant.

where for TDD serving cell, and 2 or 3 configured CSI processes, and periodic or aperiodic CSI reporting, $n_{CQI\_ref}$ is the smallest value greater than or equal to 4, such that it corresponds to a valid downlink or valid special subframe, and for aperiodic CSI reporting the corresponding CSI request is in an uplink DCI format;

where for TDD serving cell, and 2 or 3 configured CSI processes, and aperiodic CSI reporting, $n_{CQI\_ref}$ is equal to 4 and subframe $n-n_{CQI\_ref}$ corresponds to a valid downlink or valid special subframe, where subframe $n-n_{CQ/ref}$ is received after the subframe with the corresponding CSI request in a Random Access Response Grant;

where for TDD serving cell, and 4 configured CSI processes, and periodic or aperiodic CSI reporting, $n_{CQI\_ref}$ is the smallest value greater than or equal to 5, such that it corresponds to a valid downlink or valid special subframe, and for aperiodic CSI reporting the corresponding CSI request is in an uplink DCI format;

where for TDD serving cell, and 4 configured CSI processes, and aperiodic CSI reporting, $n_{CQI\_ref}$ is equal to 5 and subframe $n-n_{CQI\_ref}$ corresponds to a valid downlink or valid special subframe, where subframe $n-n_{CQI\_ref}$ is received after the subframe with the corresponding CSI request in a Random Access Response Grant.

In the time domain and for a BL/CE UE, the CSI reference resource is defined by a set of BL/CE downlink or special subframes where the last subframe is subframe $n-n_{CQI\_ref}$,
where for periodic CSI reporting $n_{CQI\_ref}$ is 4;
where for aperiodic CSI reporting $n_{CQI\_ref}$ is 4;
where each subframe in the CSI reference resource is a valid downlink or valid special subframe;
where for wideband CSI reports:
   The set of BL/CE downlink or special subframes is the set of the last $\text{ceil}(R^{CSI}/N_{NB,hop}^{ch,DL})$ subframes before $n-n_{CQI\_ref}$ used for MPDCCH monitoring by the BL/CE UE in each of the narrowbands where the BL/CE UE monitors MPDCCH, where $N_{NB,hop}^{ch,DL}$ is the number of narrowbands where the BL/CE UE monitors MPDCCH.
where for subband CSI reports:
   The set of BL/CE downlink or special subframes is the set of the last $R^{CSI}$ subframes used for MPDCCH monitoring by the BL/CE UE in the corresponding narrowband before $n-n_{CQI\_ref}$;
where $R^{CSI}$ is given by the higher layer parameter csi-NumRepetitionCE.

A subframe in a serving cell shall be considered to be a valid downlink or a valid special subframe if:
   it is configured as a downlink subframe or a special subframe for that UE, and
   in case multiple cells with different uplink-downlink configurations are aggregated and the UE is not capable of simultaneous reception and transmission in the aggregated cells, the subframe in the primary cell is a downlink subframe or a special subframe with the length of DwPTS more than $7680 \cdot T_s$, and
   except for a non-BL/CE UE in transmission mode 9 or 10, it is not an MBSFN subframe, and
   it does not contain a DwPTS field in case the length of DwPTS is $7680 \cdot T_s$ and less, and
   it does not fall within a configured measurement gap for that UE, and
   for periodic CSI reporting, it is an element of the CSI subframe set linked to the periodic CSI report when that UE is configured with CSI subframe sets, and
   for a UE configured in transmission mode 10 with multiple configured CSI processes, and aperiodic CSI reporting for a CSI process, it is an element of the CSI subframe set linked to the downlink or special subframe with the corresponding CSI request in an uplink DCI format, when that UE is configured with CSI subframe sets for the CSI process and UE is not configured with the higher layer parameter csi-SubframePatternConfig-r12, and
   for a UE configured in transmission mode 1-9, and aperiodic CSI reporting, it is an element of the CSI subframe set associated with the corresponding CSI request in an uplink DCI format, when that UE is configured with CSI subframe sets by the higher layer parameter csi-SubframePatternConfig-r12, and
   for a UE configured in transmission mode 10, and aperiodic CSI reporting for a CSI process, it is an element of the CSI subframe set associated with the corresponding CSI request in an uplink DCI format, when that UE is configured with CSI subframe sets by the higher layer parameter csi-SubframePatternConfig-r12 for the CSI process.
   except if the serving cell is a LAA Scell, and at least one OFDM symbol in the subframe is not occupied.
   except if the serving cell is a LAA Scell, and $n'_s \neq n_s$ as described in sub clause 6.10.1.1 in [3].
   except if the serving cell is a LAA Scell, and for a UE configured in transmission mode 9 or 10, the configured CSI-RS resource associated with the CSI process is not in the subframe.

For a non-BL/CE UE, if there is no valid downlink or no valid special subframe for the CSI reference resource in a serving cell, CSI reporting is omitted for the serving cell in uplink subframe n.

In the layer domain, the CSI reference resource is defined by any RI and PMI on which the CQI is conditioned.

In the CSI reference resource, the UE shall assume the following for the purpose of deriving the CQI index, and if also configured, PMI and RI:
   The first 3 OFDM symbols are occupied by control signalling
   No resource elements used by primary or secondary synchronization signals or PBCH or EPDCCH
   CP length of the non-MBSFN subframes
   Redundancy Version 0
   If CSI-RS is used for channel measurements, the ratio of PDSCH EPRE to CSI-RS EPRE is as given in subclause 7.2.5
   For transmission mode 9 CSI reporting of a non-BL/CE UE:
      CRS REs are as in non-MBSFN subframes;
      If the UE is configured for PMI/RI reporting or without PMI reporting, the UE-specific reference signal overhead is consistent with the most recent reported rank if more than one CSI-RS port is configured, and is consistent with rank 1 transmission if only one CSI-RS port is configured; and PDSCH signals on antenna ports $\{7 \ldots 6+v\}$ for v layers would result in signals equivalent to corresponding symbols transmitted on antenna ports $\{15 \ldots 14+P\}$, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(v-1)}(i) \end{bmatrix},$$

where $x(i) = [x^{(0)}(i) \ldots x^{(v-1)}(i)]^T$ is a vector of symbols from the layer mapping in subclause 6.3.3.2 of [3], $P \in \{1, 2, 4, 8, 12, 16\}$ is the number of CSI-RS ports configured, and if only one CSI-RS port is configured, $W(i)$ is 1, otherwise for UE configured for PMI/RI reporting $W(i)$ is the precoding matrix corresponding to the reported PMI applicable to $x(i)$ and for UE configured without PMI reporting $W(i)$ is the selected precoding matrix corresponding to the reported CQI applicable to $x(i)$. The corresponding PDSCH signals transmitted on antenna ports $\{15 \ldots 14+P\}$ would have a ratio of EPRE to CSI-RS EPRE equal to the ratio given in subclause 7.2.5.

For transmission mode 10 CSI reporting, if a CSI process is configured without PMI/RI reporting:

If the number of antenna ports of the associated CSI-RS resource is one, a PDSCH transmission is on single-antenna port, port 7. The channel on antenna port {7} is inferred from the channel on antenna port {15} of the associated CSI-RS resource.
  CRS REs are as in non-MBSFN subframes. The CRS overhead is assumed to be the same as the CRS overhead corresponding to the number of CRS antenna ports of the serving cell;
  The UE-specific reference signal overhead is 12 REs per PRB pair.
Otherwise,
  If the number of antenna ports of the associated CSI-RS resource is 2, the PDSCH transmission scheme assumes the transmit diversity scheme defined in subclause 7.1.2 on antenna ports {0,1} except that the channels on antenna ports {0,1} are inferred from the channels on antenna port {15, 16} of the associated CSI resource respectively.
  If the number of antenna ports of the associated CSI-RS resource is 4, the PDSCH transmission scheme assumes the transmit diversity scheme defined in subclause 7.1.2 on antenna ports {0, 1, 2, 3} except that the channels on antenna ports {0, 1, 2, 3} are inferred from the channels on antenna ports {15, 16, 17, 18} of the associated CSI-RS resource respectively.
  The UE is not expected to be configured with more than 4 antenna ports for the CSI-RS resource associated with the CSI process configured without PMI/RI reporting.
  The overhead of CRS REs is assuming the same number of antenna ports as that of the associated CSI-RS resource.
UE-specific reference signal overhead is zero.
  For transmission mode 10 CSI reporting, if a CSI process is configured with PMI/RI reporting or without PMI reporting:
  CRS REs are as in non-MBSFN subframes. The CRS overhead is assumed to be the same as the CRS overhead corresponding to the number of CRS antenna ports of the serving cell;
  The UE-specific reference signal overhead is consistent with the most recent reported rank for the CSI process if more than one CSI-RS port is configured, and is consistent with rank 1 transmission if only one CSI-RS port is configured; and PDSCH signals on antenna ports {7 . . . 6+v} for v layers would result in signals equivalent to corresponding symbols transmitted on antenna ports {15 . . . 14+P}, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(v-1)}(i) \end{bmatrix},$$

where $x(i)=[x^{(0)}(i) \ldots x^{(v-1)}(i)]^T$ is a vector of symbols from the layer mapping in subclause 6.3.3.2 of [3], P∈{1, 2, 4, 8, 12, 16} is the number of antenna ports of the associated CSI-RS resource, and if P=1.W(i) is 1, otherwise for UE configured for PMI/RI reporting W(i) is the precoding matrix corresponding to the reported PMI applicable to x(i) and for UE configured without PMI reporting W(i) is the selected precoding matrix corresponding to the reported CQI applicable to x(i). The corresponding PDSCH signals transmitted on antenna ports {15 . . . 14+P} would have a ratio of EPRE to CSI-RS EPRE equal to the ratio given in subclause 7.2.5

Assume no REs allocated for CSI-RS and zero-power CSI-RS

Assume no REs allocated for PRS
  The PDSCH transmission scheme given by Table 7.2.3-0 depending on the transmission mode currently configured for the UE (which may be the default mode).
  If CRS is used for channel measurements, the ratio of PDSCH EPRE to cell-specific RS EPRE is as given in subclause 5.2 with the exception of $\rho_A$ which shall be assumed to be
    $\rho_A=P_A+\Delta_{offset}+10\log_{10}(2)$ [dB] for any modulation scheme, if the UE is configured with transmission mode 2 with 4 cell-specific antenna ports, or transmission mode 3 with 4 cell-specific antenna ports and the associated RI is equal to one;
    $\rho_A=P_A+\Delta_{offset}$ [dB] for any modulation scheme and any number of layers, otherwise.
  The shift $\Delta_{offset}$ is given by the parameter nomPDSCH-RS-EPRE-Offset which is configured by higher-layer signalling.

[Table 7.2.3-0 of 3GPP TS 36.213 v13.1.1, entitled "PDSCH transmission scheme assumed for CSI reference resource", is reproduced as FIG. 11]

[Table 7.2.3-1 of 3GPP TS 36.213 v13.1.1, entitled "4-bit CQI Table", is reproduced as FIG. 12]

[Table 7.2.3-2 of 3GPP TS 36.213 v13.1.1, entitled "4-bit CQI Table 2", is reproduced as FIG. 13]

[Table 7.2.3-3 of 3GPP TS 36.213 v13.1.1, entitled "4-bit CQI Table 3", is reproduced as FIG. 14]

Figure 15:
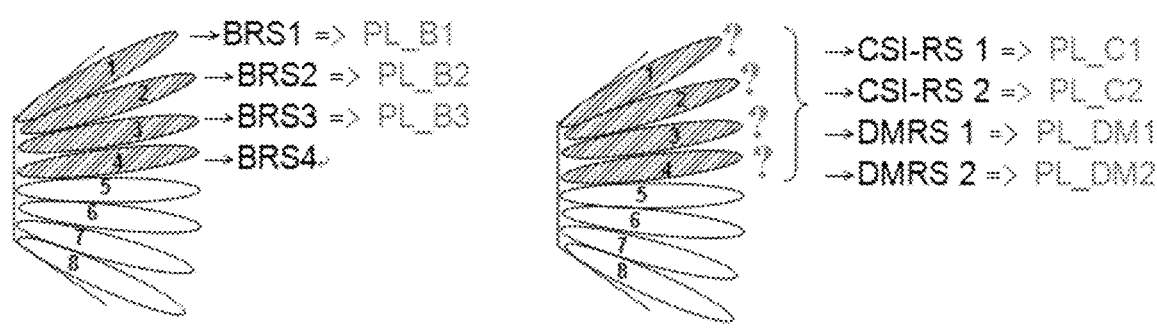
FIG. 15 is a diagram according to one exemplary embodiment.

As discussed above, physical layer procedures for beamforming generally require multi-beam based approaches. One example of multi-beam based approaches is beam sweeping. When beam sweeping is applied for a signal (or a channel), the signal (the channel) is transmitted/received on multiple beams, which are on multiple time instances in finite time duration. For example, as shown in FIG. 15, eNB requires 8 beams for the required cell area. To help beam finding/beam tracking, the eNB may transmit a signal on four of the eight BRSs at one time, and then transmit the signal on the other four of the eight beams at another time. For detecting/distinguishing eNB beams, eNB may transmit per-beam reference signal for beam tracking/beam finding. As shown in FIG. 15, the eNB transmits one beam reference signal (BRS) on one beam wherein different beams are associated with different distinct BRSs.

As for channel measurement and data/control transmission, the eNB may utilize one or multiple beams for a UE. It means that the eNB may transmit data transmission with DMRS (Demodulation Reference Signal) for UE demodulation, wherein the data and DMRS may be transmitted on beams 1 and 2 at a transmission, and may be transmitted on beams 2 and 4 at another transmission. If the beams do not have distinct DMRS, the UE may be transparent or agnostic which beams are utilized. Similarly for DMRS for control transmission and CSI-RS (Channel State Information-Reference Signal) for channel measurement, the UE may be transparent or agnostic which beams are utilized if the DMRS for control and CSI-RS are not per-beam reference signal.

In LTE system as shown in the background, the UE derives pathloss value via measuring CRS. The pathloss value, PL, is utilized for UE transmit power derivation. The eNB transmits CRS in each subframe in LTE. However, for multi-beam based approaches, BRS may not be transmitted in each subframe/TTI (Transmission Time Interval), for instance transmitted every 10 ms. CSI-RS and DMRS for a UE may not be available in each subframe/TTI as well. Also, the pathloss derivation result may be different for each DL (Downlink) RS (Reference Signal), since the BRS/DMRS/CSI-RS may be transmitted from different eNB beams, which would require consideration how the UE derives/selects a proper pathloss for UL transmit power determination in order to satisfy the received SINR at eNB side without UE power waste.

Approach 1

In this approach, the UE maintains multiple pathloss values derived from different DL RS s. Each type of UL transmission is associated with at least one DL RS for pathloss determination. Different types of UL transmissions may be associated with different DL RS(s) for pathloss determination. The association may be specified or configured or dynamically changed. The DL RS may comprise reference signal for beam tracking/beam finding, reference signal for control demodulation, reference signal for data demodulation, reference signal for channel measurement, and/or reference signal for pathloss. A pathloss value may be valid for duration of time.

More specifically, the reference signal for beam tracking/beam finding is beam reference signal (BRS). The valid duration of time may be one or multiple periodicity of BRS transmission. Alternatively, the pathloss value derives from BRS is valid until the next time beam tracking is performed. With BRS, the UE can estimate pathloss per-eNB beam, at least for the eNB beams with qualified channel quality. The eNB beam with qualified channel quality may mean the beam(s) with RSRP (Referenced Signal Received Power) or SINR (Signal to Noise and Interference Ratio) larger than some threshold or the beam(s) with PL smaller than some threshold. Alternatively, the eNB beam with qualified channel qualify may mean the beam(s) with RSRP or SINR or PL (absolute) difference smaller than some threshold comparing to the eNB beam with the best channel quality. The pathloss values derived from BRS may be utilized for multiple types of UL (Uplink) transmission, such as any of the UL data, SRS (Sounding Reference Signal), UL control, HARQ-ACK feedback, CSI report, and SR (Scheduling Request).

For UL transmit power determination, the UE may select/derive a proper combined pathloss value, e.g. depending on which eNB beams are utilized for UL reception. One way is to utilize the pathloss value of a specific eNB beam. For UL control channel, and/or SRS for channel measurement, it may be assumed that the eNB will use at least the best qualified eNB beam for ensure successful reception. Thus, the pathloss value of the eNB beam with the best channel quality can be the specific eNB beam, and the pathloss value of the specific eNB beam may be associated with UL control channel and/or SRS for channel measurement. It means that the pathloss value of the specific eNB beam is utilized for UE transmit power determination of the UL control channel and/or SRS for channel measurement. The UL control channel may comprise SR, periodic CSI, HARQ-ACK, aperiodic CSI, and a channel for beam reporting if any.

For preamble, selecting the pathloss value of the eNB beam with the best channel quality can reduce potential interference on other eNB beams. Thus, the pathloss value of the eNB beam with the best channel quality can be the specific eNB beam, and the pathloss value of the specific eNB beam may be associated with preamble. It means that the pathloss value of the specific eNB beam is utilized for UE transmit power determination of the preamble.

Another way is to utilize the selected/combined pathloss value. For UL data channel, the eNB may choose different eNB beams for scheduling flexibility. The UE requires the information of eNB reception beams for transmit power determination. Furthermore, the number of eNB reception beams may be a parameter for combined pathloss derivation. The information may be indicated in the corresponding control signaling. Based on the information, the UE may choose one value of the average pathloss value, the average pathloss value with different per-beam weighting, the largest pathloss value, or the smallest pathloss value among the indicated eNB reception beams. The UL data channel may comprise UL data transmission, aperiodic CSI, HARQ-ACK. For SRS for beam sweeping, it is assumed the eNB would receive the SRS from all eNB beams in finite time duration, the UE may choose one value of the average pathloss value, the average pathloss value with different per-beam weighting, the largest pathloss value, or the smallest pathloss value among the eNB beams with qualified channel quality. For simplicity, the SRS for channel measurement may utilize the same pathloss as the SRS for beam sweeping.

More specifically, the reference signal for control demodulation is DMRS for control. The valid duration of time may be one TTI or one subframe. Alternatively, the pathloss value derives from DMRS for control is valid for the UL transmission associated with the received control signaling. For the UL transmission with associated DL control signaling, the pathloss value for the UL transmit power determination of the UL transmission may be measured by the DMRS for the associated DL control signaling, if it is assumed that the eNB utilizes the same eNB beams for DL control signaling and associated scheduled UL transmission.

However, if the eNB reception beams for the UL transmission is not the same as the eNB transmit beams for the DL control signaling, the pathloss value for the UL transmit power determination of the UL transmission may not be derived from the DMRS for the DL control signaling, except there is any indication to indicate/imply the same eNB beams. The UL transmission associated with the DL control signaling may comprise UL data transmission, aperiodic CSI, aperiodic SRS, HARQ-ACK for DL control signaling, and/or HARQ-ACK for DL data transmission.

More specifically, the reference signal for DL data demodulation is DMRS for data. The valid duration of time may be one TTI or one subframe. Alternatively, the pathloss value derives from DMRS for data is valid for the UL transmission associated with the received DL data transmission. For the UL transmission with associated DL data transmission, the pathloss value for the UL transmit power determination of the UL transmission may be measured by the DMRS for the associated DL data transmission, if it is assumed that the eNB utilized the same eNB beams for DL data transmission and the associated UL transmission.

However, if the eNB reception beams for the UL transmission is not the same as the eNB transmit beams for the DL data transmission, the pathloss value for the UL transmit power determination of the UL transmission may not be derived from the DMRS for the DL data transmission, except there is any indication to indicate/imply the same eNB beams. The UL transmission associated with the DL data transmission may comprise HARQ-ACK for DL data transmission.

More specifically, the reference signal for channel measurement is CSI-RS. The valid duration of time may be one TTI or one subframe. Alternatively, the pathloss value derives from CSI-RS is valid for the UL transmission including CSI report measured from the corresponding received CSI-RS. The UE measures the CSI-RS depending on CSI-RS resources/processes. Which eNB beams are utilized for each CSI-RS transmission may be transparent for the UE. Considering that the eNB may schedule data transmission based on the CSI reporting, it may imply that the eNB beams for data transmission may be associated with one of the CSI-RS resources/processes. One possible way is that the UL transmit power of a data transmission is derived from the pathloss value of one associated CSI-RS resource/process, wherein the associated CSI-RS resource/process may be indicated in control signaling. Furthermore, the number of eNB transmit beams on CSI-RS may be a parameter for pathloss value derivation from CSI-RS.

More specifically, the reference signal for pathloss is pathloss RS. The eNB provides one or multiple pathloss RS beforehand depending on the expected eNB reception beams in the later associated UL TTI or UL subframe. From UE side, before UE transmits a UL transmission, the UE may determine the pathloss value depending on the associated pathloss RS measurement beforehand. The timing interval between pathloss RS and the associated UL TTI or UL subframe is specified or configured or indicated by signaling, as shown in FIG. 16.

Figure 16:
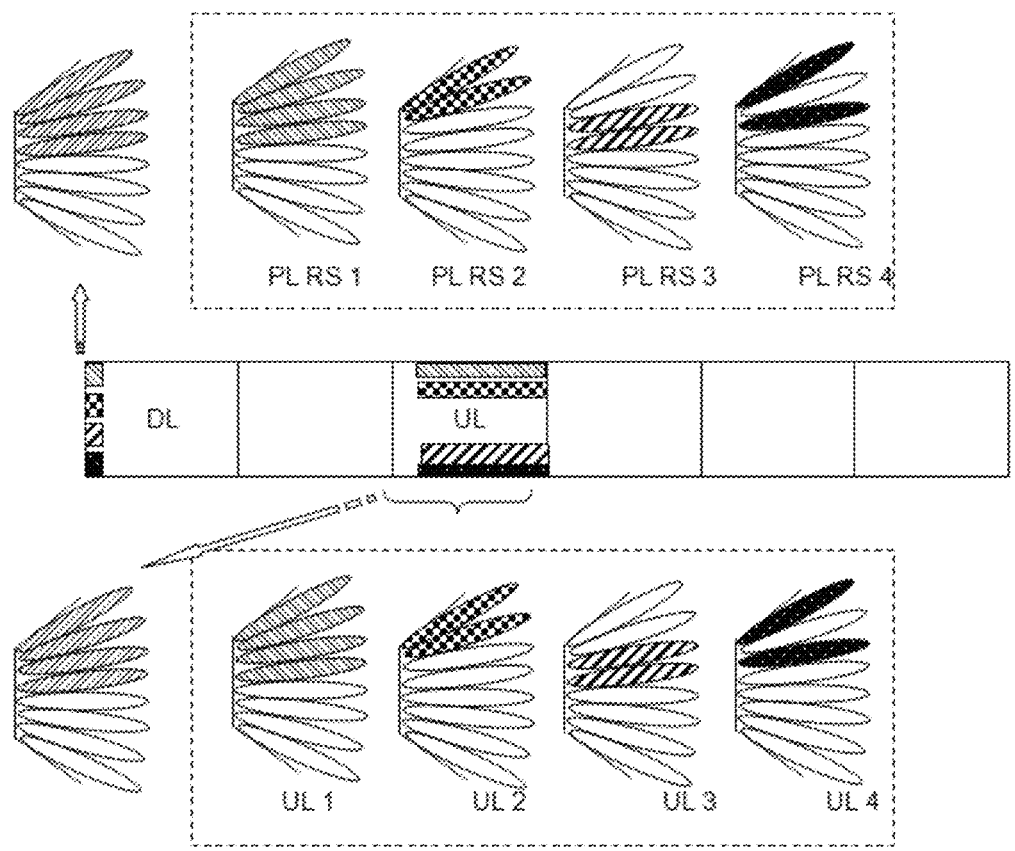
FIG. 16 is a diagram according to one exemplary embodiment.

As shown in FIG. 16, the eNB expects to receive the UL transmission from a UE via the beam pattern of UL 3. The eNB transmits PL RS3 with same(/similar/overlapped) beam pattern as UL 3, and the UE will determine UL transmit power based on the pathloss value derived from PL RS 3. The pathloss values derived from pathloss RS may be utilized for multiple types of UL transmission, such as any of the UL data, SRS, UL control, HARQ-ACK, CSI report, non-contention-based preamble, and SR. If the pathloss RS is UE-specific, the pathloss RS for UL transmit power determination may be higher layer configured or indicated in control signaling.

The pathloss values derived from UE-specific pathloss RS may not be utilized for (contention-based) preamble since the eNB cannot predict the contention-based preamble come from which UEs and which beams. If the pathloss RS is cell-specific or TRP-specific, the derived pathloss value may be lower than the real pathloss for some UE. Some compensation methods may be required. The UE may measure pathloss RS in some DL timings, wherein the DL timings may be all TTIs/all subframes or some configured TTI(s)/subframe(s). The association between a pathloss RS and the UL transmission may be specified or configured. Furthermore, the timing difference between a pathloss RS and an associated UL transmission may be specified or configured. For example, UE may receive a message including UL transmission configuration like SR configuration, the timing/resource information of measuring (pathloss) DL RS associated with the UL transmission configuration may be included in the message.

The association between DL RS and the type of UL transmission is summarized in FIG. 17. If a UL transmission is associated with different DL RS s, priority rule may be required. One priority rule is that the pathloss value derived from the latest associated DL RS is utilized for determining the UL transmit power of the UL transmission. Another priority rule is that the valid pathloss value derived from DMRS/CSI-RS is utilized for determining the UL transmit power of some types of UL transmission, instead of the valid pathloss value derived from BRS. Some types of UL transmissions may comprise UL data transmission, aperiodic CSI report, aperiodic SRS, SRS for channel measurement, HARQ-ACK.

Alternatively, the valid pathloss value derived from BRS is utilized for determining the UL transmit power of some types of UL transmission, instead of the valid pathloss value derived from DMRS/CSI-RS. Some types of UL transmissions may comprise SR, periodic CSI report, periodic SRS, SRS for beam sweeping. Moreover, valid pathloss value derived from DMRS/CSI-RS is utilized for determining the UL transmit power, instead of the valid pathloss value derived from pathloss RS. Valid pathloss value derived from pathloss RS is utilized for determining the UL transmit power, instead of the valid pathloss value derived from BRS. Alternatively, the valid pathloss value derived from pathloss RS is utilized for determining the UL transmit power, instead of the valid pathloss value derived from DMRS/CSI-RS.

Approach 2

In this approach, the UE maintains one pathloss value. The pathloss value may be measured/derived from reference signal for pathloss. Alternatively, the pathloss value may be measured/derived from the beam reference signal of one specific eNB beam with the best qualified channel quality. The eNB provides power offset for each type of UL transmission to compensate the power difference duo to different and multiple eNB beams reception. Moreover, one power state adjusted by TPC command may be applied for multiple types of UL transmissions.

The eNB may estimate the pathloss value of each eNB beam based on a per-beam channel quality reporting from UE or SRS sweeping measurement. The estimation helps the eNB to select proper power offset for each types of UL transmission. The power offset may be configured or indicated for different types of UL transmission. More specifically, for the case that the power offset is provided from higher layer configuration or MAC CE, the types of UL transmission may comprise (contention-based) preamble, SR, periodic CSI (one power offset for all CSI-RS resources/processes or one power offset for each CSI-RS resource/process), and/or periodic SRS. For the case that the power offset is indicated from DL control signaling, the types of UL transmission may comprise UL data without control signaling, UL data with control signaling, aperiodic CSI, aperiodic SRS, HARQ-ACK for DL control signaling, HARQ-ACK for DL data transmission, and/or non-contention-based preamble. Moreover, the DL control signaling may indicate one of some configured power offset values.

As for the reference signal for pathloss, the eNB provides one or multiple pathloss RS beforehand depending on the expected eNB reception beams in the later associated UL TTI or UL subframe, as illustrated in FIG. 16 for example. The eNB expects to receive the UL transmission from a UE via the beam pattern of UL 2. The eNB transmits PL RS2 with same(/similar/overlapped) beam pattern as UL 2, and the UE may determine UL transmit power based on the pathloss value derived from PL RS 2. If eNB receives the UL transmission from another UE via the beam pattern not including UL1-4, the power offset can compensate the power difference for the UL transmission from the UE.

From the UE side, before UE transmits a UL transmission, the UE may determine the pathloss value depending on the associated pathloss RS measurement and associated power offset beforehand. The pathloss values derived from pathloss RS may be utilized for multiple types of UL transmission, such as any of the UL data, SRS, UL control, HARQ-ACK, CSI report, non-contention-based preamble, and SR.

If the pathloss RS is UE-specific, the pathloss RS for UL transmit power determination may be higher layer configured or indicated in control signaling. The pathloss values derived from UE-specific pathloss RS may not be utilized for (contention-based) preamble since the eNB cannot predict the contention-based preamble come from which UEs and which beams.

If the pathloss RS is cell-specific or TRP-specific, the derived pathloss value may be different than the real pathloss for some UE. Power offset methods can compensate the difference. The UE may measure pathloss RS in some DL timings, wherein the DL timings may be all TTIs/all subframes or some configured TTI(s)/subframe(s). The association between a pathloss RS and the UL transmission may be specified or configured. Furthermore, the timing difference between a pathloss RS and an associated UL transmission may be specified or configured. For example, UE may receive a message including UL transmission configuration like SR configuration, the timing/resource information of measuring (pathloss) DL RS associated with the UL transmission configuration may be included in the message.

Figure 18:
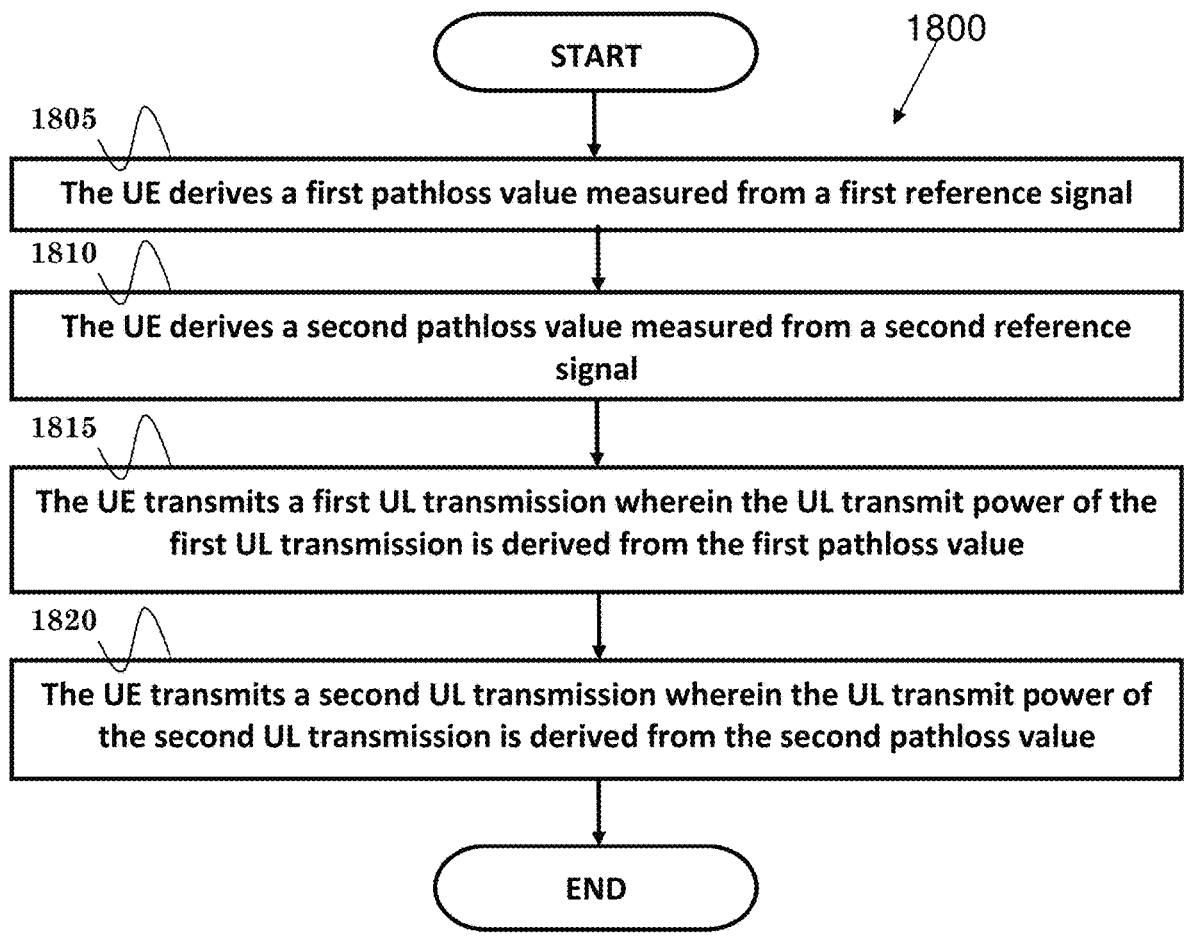
FIG. 18 is a flow chart according to one exemplary embodiment from the perspective of a user equipment.

FIG. 18 is a flow chart 1800 according to one exemplary embodiment from the perspective of a UE. In step 1805, the UE derives a first pathloss value measured from a first reference signal. In step 1810, the UE derives a second pathloss value measured from a second reference signal. In step 1815, the UE transmits a first UL transmission wherein the UL transmit power of the first UL transmission is derived from the first pathloss value. In step 1820, the UE transmits a second UL transmission wherein the UL transmit power of the second UL transmission is derived from the second pathloss value.

In one embodiment, the first reference signal and the second reference signal could be transmitted on different beams, and could be received by eNB on different beams. Furthermore, the first UL transmission and the second UL transmission can be different types of UL transmission.

In one embodiment, the type of the first UL transmission is associated with at least the first reference signal for pathloss derivation, and the type of the second UL transmission is associated with at least the second reference signal for pathloss derivation. Furthermore, the association between the type of UL transmission and reference signal can be specified or configured or indicated via signalling.

In one embodiment, the first reference signal could be at least one of a reference signal for beam tracking/beam finding, a reference signal for control demodulation, a reference signal for data demodulation, a reference signal for channel measurement, or a reference signal for pathloss. In one embodiment, the second reference signal could be at least one of a reference signal for beam tracking/beam finding, a reference signal for control demodulation, a reference signal for data demodulation, a reference signal for channel measurement, or a reference signal for pathloss. Furthermore, the reference signal for beam tracking/beam finding is a beam reference signal. In addition, the reference signal for beam tracking/beam finding is beam-specific, and different beams correspond to different and distinct reference signals for beam tracking/beam finding.

In one embodiment, the pathloss value derived from the reference signal for beam tracking/beam finding is valid until a next time beam tracking is performed. Furthermore, the valid duration of the pathloss value derived from the reference signal for beam tracking/beam finding could be one or multiple periodicity of the reference signal for beam tracking/beam finding.

In one embodiment, the UE derives per-beam pathloss measured from the reference signal for beam tracking/beam finding, at least for the beams with qualified channel quality. In addition, for pathloss derivation, the type of UL transmissions associated with at least the reference signal for beam tracking/beam finding comprise UL data transmission, SRS, UL control channel, HARQ-ACK feedback, CSI report, and SR.

In one embodiment, the pathloss value of the beam with the best channel quality could be utilized for deriving UL transmit power of the associated type of UL transmission. In addition, the type of UL transmission associated with the pathloss value of the beam with the best channel quality could comprise of a preamble, a SR, a periodic CSI, a SRS for channel measurement, a HARQ-ACK, an aperiodic CSI, and/or a new channel for beam reporting. Furthermore, the pathloss value for deriving UL transmit power of the associated type of UL transmission could be a selected value or a combined pathloss value among multiple beams, wherein the multiple beams could be indicated via signalling or configured. In addition, the selected pathloss value could be the largest pathloss value among the multiple beams. Alternatively, the selected pathloss value is the smallest pathloss value among the multiple beams.

In one embodiment, the combined pathloss value could be the average pathloss value among the multiple beams, or the average pathloss value with different per-beam weighting among the multiple beams. Furthermore, the number of eNB reception beams could be a parameter for deriving the combined pathloss value. In addition, the type of UL transmission associated with the selected or combined pathloss value among multiple beams could comprise of a UL data transmission, a SRS for beam sweeping, an aperiodic CSI, a HARQ-ACK, and/or a SRS for channel measurement.

In one embodiment, the reference signal for control demodulation could be DMRS (DeModulation Reference Signal) for control. In addition, the valid duration of the pathloss value derived from the reference signal for control demodulation is one TTI or one subframe. Furthermore, the pathloss value derived from the reference signal for control demodulation is valid for the UL transmission associated with the received control signalling. In addition, the type of UL transmission associated with the reference signal for control demodulation could comprise of a UL data transmission, an aperiodic CSI, an aperiodic SRS, a HARQ-ACK for DL control signaling, and/or a HARQ-ACK for DL data transmission.

In one embodiment, the reference signal for data demodulation could be DMRS for data. In addition, the valid duration of the pathloss value derived from the reference signal for data demodulation could be one TTI or one subframe. Furthermore, the pathloss value derived from the reference signal for data demodulation is valid for the UL transmission associated with the received DL data transmission. Also, the type of UL transmission associated with the reference signal for data demodulation could comprise a HARQ-ACK for DL data transmission.

In one embodiment, the reference signal for channel measurement could be a CSI-RS. In addition, the valid duration of the pathloss value derived from the reference signal for channel measurement could be one TTI or one subframe. Furthermore, the pathloss value derived from the reference signal for channel measurement is valid for the UL transmission including CSI report measured from the corresponding received reference signal for channel measurement. Also, the type of UL transmission associated with the reference signal for data demodulation could comprise of an aperiodic CSI, a periodic CSI, and/or an UL (Uplink) data transmission. Furthermore, if UL transmit power of a UL data transmission is derived from the pathloss value derived from one associated CSI-RS resource/process, the associated CSI-RS resource/process could be indicated in control signaling which schedules the UL data transmission.

In one embodiment, the reference signal for pathloss is pathloss RS. For a UL transmission, the UE determines the pathloss value measured from the associated reference signal for pathloss beforehand. In addition, the timing interval between the reference signal for pathloss and the associated UL TTI or UL subframe could be specified or configured or indicated by signaling. Furthermore, the types of UL transmission associated with the reference signal for pathloss could comprise of an UL data, a SRS, an UL control, a HARQ-ACK, a CSI report, a non-contention-based preamble, and/or a SR.

In one embodiment, the reference signal for pathloss could be UE-specific, and the reference signal for pathloss for UL transmit power determination could be higher layer configured or indicated in control signaling. Alternatively, the reference signal for pathloss could be cell-specific or TRP-specific.

In on embodiment, the UE measures the reference signal for pathloss in some DL timings, wherein the DL timings are all TTIs/all subframes or some configured TTI(s)/subframe(s). Furthermore, the association between the reference signal for pathloss and the associated type of UL transmission could be specified or configured. In addition, the timing difference between the reference signal for pathloss and the associated type of UL transmission could be specified or configured.

In one embodiment, if a type of UL transmission is associated with different reference signals, one reference signal of the different reference signals could be determined for the pathloss value utilized for determining UL transmit power of the UL transmission. In addition, the pathloss value of the latest associated reference signal could be utilized for determining the UL transmit power of the UL transmission. Furthermore, the valid pathloss value derived from the reference signal for data or control demodulation or the reference signal for channel measurement could be utilized for determining the UL transmit power of first some types of UL transmission, instead of the valid pathloss value derived from the reference signal for beam tracking/beam finding.

In one embodiment, some types of UL transmissions could comprise an UL data transmission, an aperiodic CSI report, an aperiodic SRS, a SRS for channel measurement, and/or a HARQ-ACK. Furthermore, the valid pathloss value derived from the reference signal for beam tracking/beam finding could be utilized for determining the UL transmit power of second some types of UL transmission, instead of the valid pathloss value derived from the reference signal for data or control demodulation or the reference signal for channel measurement.

In one embodiment, some types of UL transmissions could comprise a SR, a periodic a CSI report, a periodic SRS, and/or a SRS for beam sweeping. In addition, the valid pathloss value could be derived from the reference signal for data or control demodulation or the reference signal for channel measurement could be utilized for determining the UL transmit power of some types of UL transmission, instead of the valid pathloss value derived from the reference signal for pathloss. The valid pathloss value could also be derived from the reference signal for pathloss is utilized for determining the UL transmit power of some types of UL transmission, instead of the valid pathloss value derived from the reference signal for beam tracking/beam finding. The valid pathloss value could further be derived from the reference signal for beam tracking/beam finding is utilized for determining the UL transmit power of some types of UL transmission, instead of the valid pathloss value derived from the reference signal for pathloss. In addition, the valid pathloss value could be derived from the reference signal for pathloss is utilized for determining the UL transmit power of some types of UL transmission, instead of the valid pathloss value derived from the reference signal for data or control demodulation or the reference signal for channel measurement.

Referring back to FIGS. 3 and 4, in one exemplary embodiment of a UE, the device 300 includes a program code 312 stored in the memory 310. The CPU 308 could execute program code 312 to enable the UE (i) to derive a first pathloss value measured from a first reference signal, (ii) to derive a second pathloss value measured from a second reference signal, (iii) to transmit a first UL transmission wherein the UL transmit power of the first UL transmission is derived from the first pathloss value, and (iv) to transmit a second UL transmission wherein the UL transmit power of the second UL transmission is derived from the second pathloss value. Furthermore, the CPU 308 can execute the program code 312 to perform all of the above-described actions and steps or others described herein.

Figure 19:
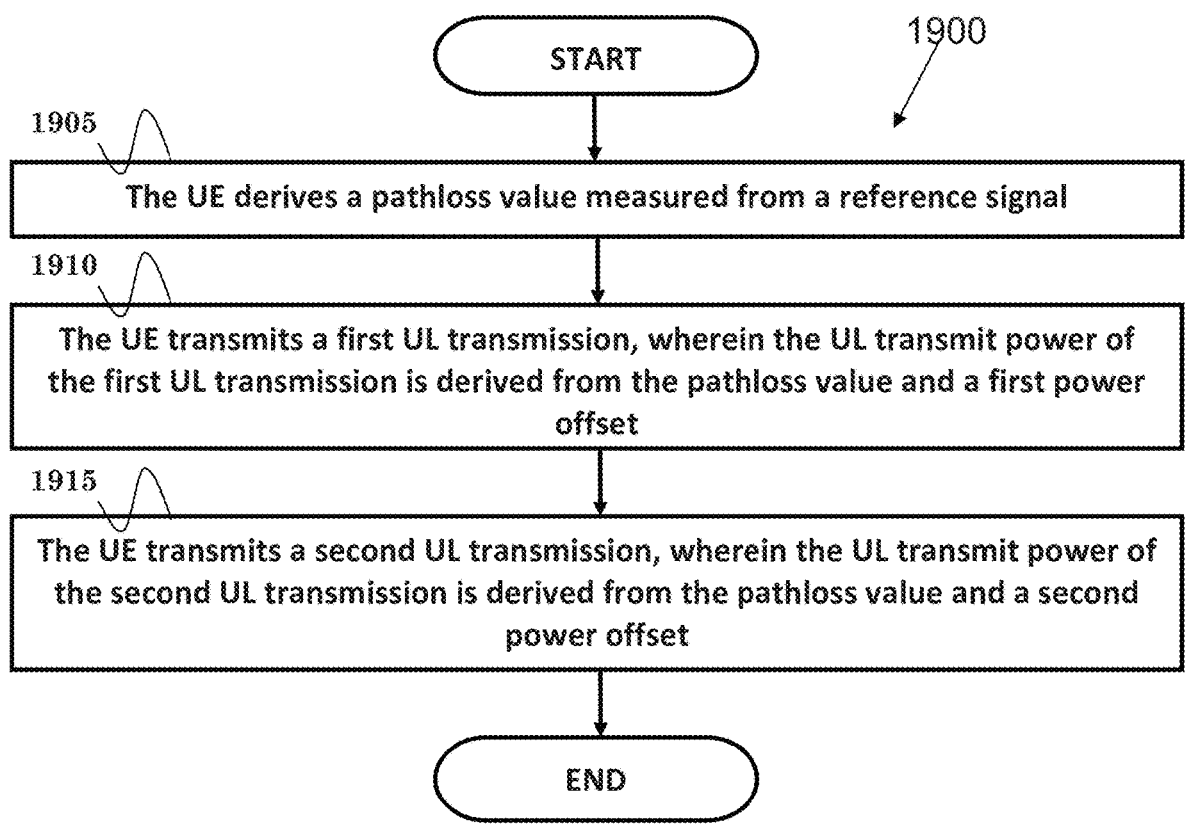
FIG. 19 is a flow chart according to one exemplary embodiment from the perspective of a user equipment.

FIG. 19 is a flow chart 1900 according to one exemplary embodiment from the perspective of a UE. In step 1905, the UE derives a pathloss value measured from a reference signal. In step 1910, the UE transmits a first UL (Uplink) transmission, wherein the UL transmit power of the first UL transmission is derived from the pathloss value and a first power offset. In step 1915, the UE transmits a second UL transmission, wherein the UL transmit power of the second UL transmission is derived from the pathloss value and a second power offset.

In one embodiment, the first UL transmission and the second UL transmission could be on the same interface. Furthermore, the first UL transmission and the second UL transmission could be received by eNB on different beams. In addition, the first UL transmission and the second UL transmission could be different types of UL transmission.

In one embodiment, for a type of UL transmission, a power offset could be provided to compensate the power difference duo to difference between transmit beams of the reference signal and reception beams of the type of UL transmission. Furthermore, different power offsets are configured or indicated for different types of UL transmission.

In one embodiment, the reference signal could a reference signal for beam tracking/beam finding, or a reference signal for pathloss. In addition, one power state adjusted by TPC (Transmit Power Control) command is applied for multiple types of UL transmissions.

In one embodiment, for some types of UL transmission, the associated power offset could provided from higher layer configuration or MAC CE. In addition, these types of UL transmission could comprise (contention-based) preamble, SR, periodic CSI, and/or periodic SRS. For periodic CSI, there could be one power offset for all CSI-RS resources/processes, or one power offset for each CSI-RS resource/process.

In one embodiment, for some types of UL transmission, the associated power offset could be indicated from DL control signaling. Furthermore, these types of UL transmission could comprise UL data without control signaling, UL data with control signaling, aperiodic CSI, aperiodic SRS, HARQ-ACK for DL control signaling, HARQ-ACK for DL data transmission, and/or non-contention-based preamble.

In one embodiment, the pathloss value could be derived from the reference signal for beam tracking/beam finding. Furthemore, the reference signal for beam tracking/beam finding could be BRS. In addition, the reference signal for beam tracking/beam finding could be beam-specific, and different beams could correspond to different and distinct reference signals for beam tracking/beam finding.

In one embodiment, the pathloss value could be derived from the reference signal for beam tracking/beam finding of one specific beam with the best qualified channel quality. Furthermore, the pathloss value derived from the reference signal for beam tracking/beam finding is valid until next time performing beam tracking. In addition, the valid duration of the pathloss value derived from the reference signal for beam tracking/beam finding could be one or multiple periodicity of the reference signal for beam tracking/beam finding.

In one embodiment, the pathloss value could be derived from the reference signal for pathloss. Furthermore, the reference signal for pathloss is pathloss RS. In addition, for a UL transmission, the UE could derive the pathloss value measured from the associated reference signal for pathloss beforehand. Also, the timing interval between the reference signal for pathloss and the associated UL TTI or UL subframe could be specified or configured or indicated by signaling. The types of UL transmission associated with the reference signal for pathloss could comprise UL data, SRS, UL control, HARQ-ACK, CSI report, non-contention-based preamble, and/or SR.

In one embodiment, the reference signal for pathloss could be UE-specific, and the reference signal for pathloss for UL transmit power determination could be higher layer configured or indicated in control signaling. Alternatively, the reference signal for pathloss could be cell-specific or TRP-specific.

In one embodiment, the UE measures the reference signal for pathloss in some DL timings, wherein the DL timings are all TTIs/all subframes or some configured TTI(s)/subframe(s). Furthermore, the association between the reference signal for pathloss and the associated type of UL transmission could be specified or configured. In addition, the timing difference between the reference signal for pathloss and the UL transmission could be specified or configured.

In one embodiment, the interface could be the radio interface between the UE and the radio access network, the radio interface between the UE and eNB, or the Uu interface.

Referring back to FIGS. 3 and 4, in one exemplary embodiment of a UE, the device 300 includes a program code 312 stored in the memory 310. The CPU 308 could execute program code 312 to enable the UE (i) to derive a pathloss value measured from a reference signal, (ii) to transmits a first UL transmission, wherein the UL transmit power of the first UL transmission is derived from the pathloss value and a first power offset, and (iii) to transmits a second UL transmission, wherein the UL transmit power of the second UL transmission is derived from the pathloss value and a second power offset. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of deriving UE transmit power for UL (Uplink) transmission to a Transmission/Reception Point (TRP), comprising:
   a UE derives a first pathloss value measured from a first reference signal;
   the UE derives a second pathloss value measured from a second reference signal;
   the UE transmits a first UL transmission to the TRP wherein a UL transmit power of the first UL transmission is derived from the first pathloss value; and
   the UE transmits a second UL transmission to the same TRP wherein a UL transmit power of the second UL transmission is derived from the second pathloss value; and
   wherein the first reference signal and the second reference signal are different types of reference signals.

2. The method of claim 1, wherein the first UL transmission and the second UL transmission are different types of UL transmission.

3. The method of claim 2, wherein the type of the first UL transmission is associated with at least the first reference signal for pathloss derivation, and the type of the second UL transmission is associated with at least the second reference signal for pathloss derivation.

4. The method of claim 3, wherein the association between the type of UL transmission and reference signal is specified or configured or indicated via signalling.

5. The method of claim 1, wherein the first reference signal is at least one of a reference signal for beam tracking/beam finding, a reference signal for control demodulation, a reference signal for data demodulation, a reference signal for channel measurement, or a reference signal for pathloss, and/or the second reference signal is at least one of a reference signal for beam tracking/beam finding, a reference signal for control demodulation, a reference signal for data demodulation, a reference signal for channel measurement, or a reference signal for pathloss.

6. The method of claim 5, wherein the reference signal for beam tracking/beam finding is a beam reference signal.

7. The method of claim 1, wherein the pathloss value for deriving UL transmit power of the associated type of UL transmission is selected among multiple beams, and the selected pathloss value is the smallest pathloss value among the multiple beams.

8. The method of claim 5, wherein the reference signal for control demodulation is DMRS (Demodulation Reference Signal) for control.

9. The method of claim 8, wherein the pathloss value derived from the reference signal for control demodulation is valid for the UL transmission associated with the received control signalling.

10. The method of claim 5, wherein the reference signal for data demodulation is DMRS (Demodulation Reference Signal) for data.

11. The method of claim 10, wherein the pathloss value derived from the reference signal for data demodulation is valid for the UL transmission associated with the received DL (Downlink) data transmission.

12. The method of claim 5, the type of UL transmission associated with the reference signal for data demodulation comprises: HARQ-ACK (Hybrid Automatic Repeat Request-Acknowledgement), an aperiodic CSI, a periodic CSI, and/or an UL data transmission.

13. The method of claim 5, wherein the reference signal for channel measurement is CSI-RS (Channel State Information-Reference Signal).

14. The method of claim 1, wherein if UL transmit power of a UL data transmission is derived from the pathloss value derived from one associated CSI-RS (Channel State Information-Reference Signal) resource/process, the associated CSI-RS resource/process is indicated in control signaling which schedules the UL data transmission.

15. The method of claim 1, wherein if a type of UL transmission is associated with different reference signals, one reference signal of the different reference signals is determined for the pathloss value utilized for determining UL transmit power of the UL transmission.

16. The method of claim 15, wherein the pathloss value of the latest associated reference signal is utilized for determining the UL transmit power of the UL transmission.

17. The method of claim 5, wherein the valid pathloss value derived from the reference signal for data or control demodulation or the reference signal for channel measurement is utilized for determining the UL transmit power of first some types of UL transmission, instead of the valid pathloss value derived from the reference signal for beam tracking/beam finding.

18. The method of claim 5, wherein the type of UL transmission associated with the reference signal for beam tracking/beam finding comprises: UL data transmission, SRS (Sounding Reference Signal), UL control, HARQ-ACK (Hybrid Automatic Repeat Request-Acknowledgement), CSI (Channel State Information) report, SR (Scheduling Request), and/or preamble.

19. The method of claim 5, wherein the type of UL transmission associated with the reference signal for channel measurement comprises: an aperiodic CSI (Channel State Information), a periodic CSI, and/or an UL data transmission.

20. The method of claim 1, wherein the first UL transmission and the second UL transmission are transmitted on different beams, and
wherein the first path loss value and the second path value are derived based on the different beams respectively.

21. The method of claim 1, wherein the first reference signal is a reference signal for channel measurement, and the first UL transmission is a first UL data transmission,
and wherein the second reference signal is a reference signal for beam tracking or beam finding, and the second UL transmission is a second UL data transmission.

22. The method of claim 1, wherein the first reference signal is a reference signal for channel measurement, and the first UL transmission is UL data transmission,
and wherein the second reference signal is a reference signal for beam tracking or beam finding, and the second UL transmission is any of preamble, SRS, UL control, HARQ-ACK, CSI report, SR.

23. The method of claim 1, wherein the first reference signal is a reference signal for channel measurement, and the first UL transmission is UL data transmission,
and wherein the second reference signal is a reference signal for data demodulation, and the second UL transmission is any of HARQ-ACK for DL data transmission, an aperiodic CSI, a periodic CSI.

24. A UE (User Equipment) for deriving transmit power for UL(Uplink) transmission to a Transmission/Reception Point (TRP), comprising:
a control circuit;
a processor installed in the control circuit; and
a memory installed in the control circuit and operatively coupled to the processor, wherein the processor is configured to execute a program code stored in the memory to perform operations comprising:
deriving a first pathloss value measured from a first reference signal;
deriving a second pathloss value measured from a second reference signal;
transmitting a first UL transmission to the TRP wherein a UL transmit power of the first UL transmission is derived from the first pathloss value; and
transmitting a second UL transmission to the same TRP wherein a UL transmit power of the second UL transmission is derived from the second pathloss value; and
wherein the first reference signal and the second reference signal are different types of reference signals.

* * * * *